United States Patent
Garg et al.

(10) Patent No.: US 11,341,660 B1
(45) Date of Patent: May 24, 2022

(54) FEATURE BASED IMAGE DETECTION

(71) Applicant: Amazon Technologies, Inc., Seattle, WA (US)

(72) Inventors: Nikhil Garg, Berlin (DE); Brad Bowman, Berlin (DE); Toma Belenzada, Berlin (DE); Michael Donoser, Berlin (DE)

(73) Assignee: Amazon Technologies, Inc., Seattle, WA (US)

( * ) Notice: Subject to any disclaimer, the term of this patent is extended or adjusted under 35 U.S.C. 154(b) by 115 days.

(21) Appl. No.: 16/834,958

(22) Filed: Mar. 30, 2020

(51) Int. Cl.
G06T 7/33 (2017.01)
G06Q 30/06 (2012.01)
G06V 10/10 (2022.01)

(52) U.S. Cl.
CPC ........... *G06T 7/33* (2017.01); *G06Q 30/0603* (2013.01); *G06T 7/337* (2017.01); *G06V 10/10* (2022.01); *G06Q 30/0643* (2013.01)

(58) Field of Classification Search
CPC . G06T 7/33; G06T 7/337; G06K 9/78; G06Q 30/0603; G06Q 30/0643
See application file for complete search history.

(56) References Cited

U.S. PATENT DOCUMENTS

| | | | | |
|---|---|---|---|---|
| 9,014,516 | B2* | 4/2015 | Boncyk | G06K 9/3241 382/305 |
| 2008/0212899 | A1* | 9/2008 | Gokturk | G06Q 30/0603 382/305 |
| 2009/0110298 | A1* | 4/2009 | Seeber | G06F 16/5838 382/218 |
| 2013/0188886 | A1* | 7/2013 | Petrou | G06K 9/00671 382/305 |
| 2016/0117572 | A1* | 4/2016 | Bhardwaj | G06F 16/583 382/165 |
| 2016/0350886 | A1* | 12/2016 | Jessen | G06Q 10/10 |

\* cited by examiner

*Primary Examiner* — Matthew C Bella
*Assistant Examiner* — Kathleen M Broughton
(74) *Attorney, Agent, or Firm* — Knobbe, Martens, Olson & Bear, LLP

(57) ABSTRACT

System and methods are provided for improved visual search systems that can use local features of images. The search system provides a user interface that enables a user to select areas or portions of an image to search on the selected features and the overall appearance of the image. The search system further provides customized user interfaces to exclude certain portions of images from the search algorithms. The search system can be used to detect potential intellectual property risks associated with items in an electronic catalog.

17 Claims, 20 Drawing Sheets

Results

| | | | | | | |
|---|---|---|---|---|---|---|
| [Copy IDs] 302A | [Copy Titles] 302B | [Copy Entities] 302C | [Copy All] 302D | [CSV] 302E | [Select All] 302F | [Deselect All] 302G |

| Select | Link | Item ID | Title | | Entity |
|---|---|---|---|---|---|
| ☐ | 🕰 | F76878cc | Quartz Pocket Watch Stainless Steel | | Acme |
| ☐ | 🕰 | 01d0d9bd | Polished Mechanical Pocket Watch | | UBS |
| ☐ | 🕰 | 811dd26b | Vintage Pocket Watch | | Stein |
| ☐ | 🕰 | Aa55e934 | Retro Pocket Watch | | St. Charles |

FEATURE BASED IMAGE DETECTION

BACKGROUND

Some intellectual property can be directed towards visual aspects, such as the visual appearance of a product. In this regard, examples of visual intellectual property include design patents, design registrations, trademarks, and copyrights. Possible risks associated with visual intellectual property can be investigated by a user. For example, in an electronic catalog context, a user can review items in the catalog and flag some of them as being subject to a design patent, design registration, trademark or copyright.

BRIEF DESCRIPTION OF THE DRAWINGS

These and other features, aspects and advantages are described below with reference to the drawings, which are intended for illustrative purposes and should in no way be interpreted as limiting the scope of the embodiments. Furthermore, various features of different disclosed embodiments can be combined to form additional embodiments, which are part of this disclosure. In the drawings, like reference characters can denote corresponding features throughout similar embodiments. The following is a brief description of each of the drawings.

FIG. 3 is a pictorial diagram of an example search results user interface of the search system.

DETAILED DESCRIPTION

Figure 1A:
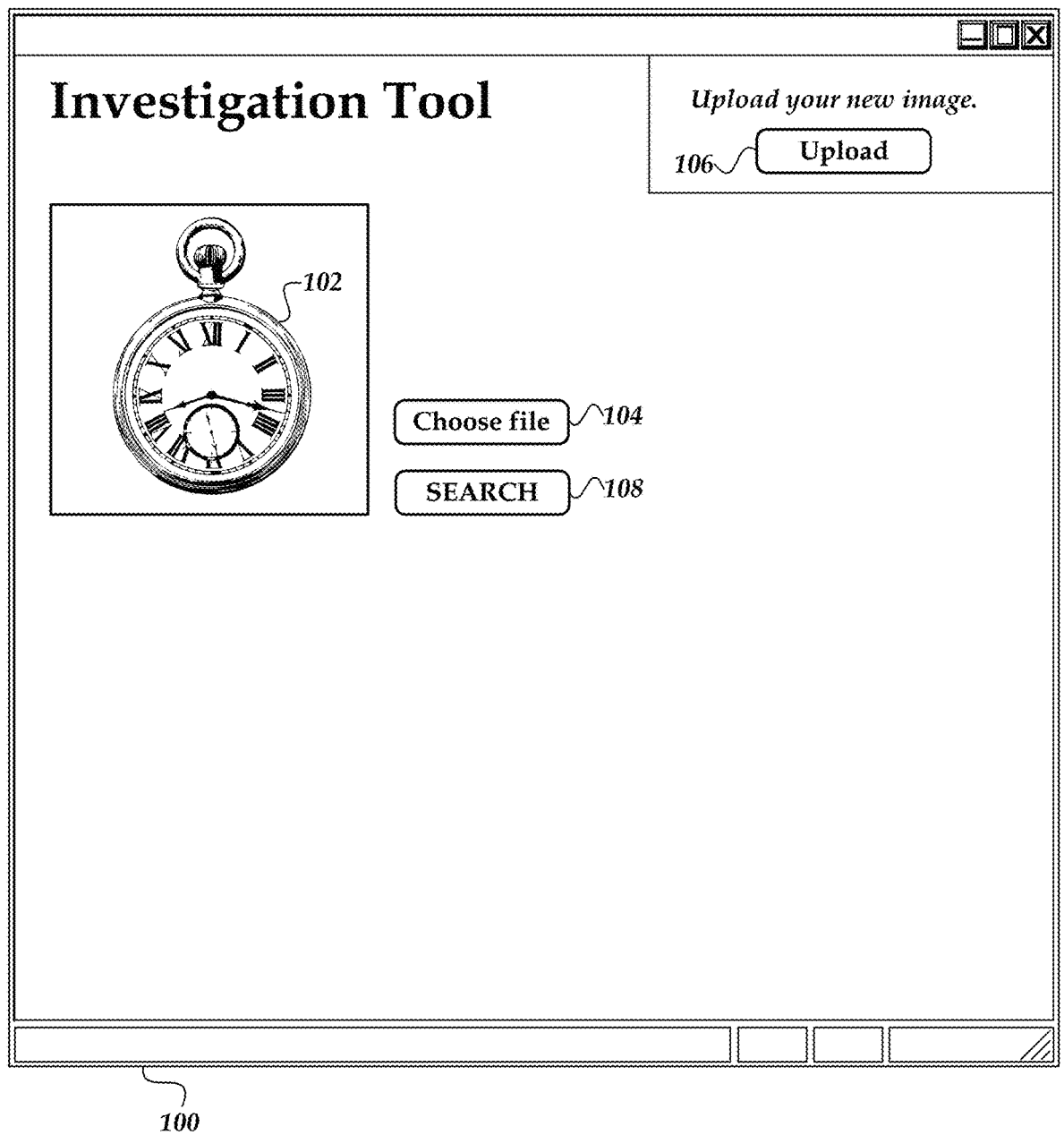
FIGS. 1A-1E are pictorial diagrams of an example user interface of a search system.

As described above, visual intellectual property can include design patents, design registrations, trademarks, and copyrights. In some kinds of visual intellectual property, such as design patents and design registrations, portions of an item (as opposed to an entire product) can be protected by the intellectual property. For example, a design patent can cover a portion of a product, such as the bezel of watch, and can omit claiming other portions of the product, such as the face of the watch.

Generally described, aspects of the present disclosure are directed to improved graphical user interfaces that enable detection of images with particular features. Generally described, aspects of the present disclosure are directed to improved computer vision and machine learning systems and methods. Some of these systems and methods can be used to investigate whether an object visible in an image is subject to a type of visual intellectual property. For example, a user can specify an input image of an object that is considered by an intellectual property holder to be subject to the holder's visual intellectual property. The user can further specify one or more coordinates and/or features on the input image. The search system can search an electronic catalog based on the one or more coordinates and/or features and return images of similar objects. The search system can also search the electronic catalog for images of similar objects based on overall appearance of the input image. The search results can be presented in a user interface for further review.

While some methods exist for identifying images of objects or products subject to visual intellectual property, they have drawbacks. For example, a user can specify keyword parameters or categories (such as such as "Clothing>Women>Shoes>Wedge") to search an electronic catalog, and then the user can review the search results; however, such methods are dependent on the user's choice of specific, text-based keywords. Alternatively, some existing search systems can perform image matching on an electronic catalog using an initial image, where the initial image can be associated with some intellectual property. Visual search systems typically match the complete product image against a database of product images. However, these existing methods lack graphical user interfaces for searching based on user-selected features. Moreover, theses existing methods lack computer vision techniques that can focus on user-selected features.

The systems and methods described herein may improve graphical user interfaces. For example, instead of exclusively relying on text-based, user-selected keywords or categories, the graphical user interfaces described herein can allow a user to search images based on a user-selected feature(s) of an input image. Moreover, the improved graphical user interfaces may be configured to present the search results in a format that efficiently allows a user to review the results and identify particular items that may pose potential risks. Accordingly, the improved graphical user interfaces can enable a user to identify objects subject to visual intellectual property in a quicker and/or more deterministic manner than existing graphical user interfaces.

The systems and methods described herein may improve computer vision and machine learning technology. In addition to machine learning techniques to identify similar images based on the overall appearance of the image, the systems and methods described herein may receive user selected coordinate(s) or area(s) of an image as input. The entire input image can be fed into a neural network to extract features on a grid, and a nearest neighbor search can be applied to identify images that have features that are similar to the specified features of the input image as well as an overall appearance that is similar to the input image. However, the specified features of the input image can be weighted higher than the overall appearance of the image. As described herein, some existing computer vision techniques rely on the final layer of a convolutional neural network. However, the systems and methods described herein can use a particular layer of a convolutional neural network to search for particular features from an input image, where the particular layer maps feature vectors to a grid. Accordingly, the techniques described herein can improve over existing computer vision and machine learning techniques.

As will be described in further detail below, the disclosed technology includes a system for allowing users to identify possible infringing items in an electronic catalog of items offered for sale by an e-commerce vendor. In some embodiments, the vendor maintains a database of feature vectors that are pre-computed for images of items in the catalog. In one example, the feature vectors are computed in an internal layer (e.g., not the last layer) of a convolutional neural network such as the RESNET convolutional neural network. In another example, the feature vectors are computed in a last layer of a convolutional neural network in which the last layer computes a grid of features. In one embodiment, the layer used is a layer that computes a 7×7 grid of feature vectors, which can be mapped to known locations in the image. Each feature vector is an array of values (such as some 2000 or so values) that can vary depending on the neural network architecture. For a fully convolutional neural network, an input image of any resolution can be passed into the network. For example, in some embodiments, an input image of resolution 224×224 results in a 7×7 feature grid, a 448×448 input image would result in a 14×14 feature grid, etc. Thus, in some embodiments, the input image resolution may be standardized to standardize the output feature grid sizes.

The user, such as an intellectual property rights holder or their designee, supplies or identifies an input image representing their intellectual property and wants to search the catalog for images that may contain their intellectual property. Such intellectual property could be the overall design of an item, or a portion of the design, the color or a portion of the item, a trademark (design or logo) etc. The user is able to identify one or more interest points in the input image that define that intellectual property. For example, if a particular portion on an earphone is protected by a design patent, the user may select that portion on the image or if an image contains the trademark logo, the user can select the area of the image having the logo. The particular interest point selected by the user may not line up exactly with the location of grid points where the feature vectors are computed in the neural network. Since the location of the grid points where the feature vectors for an image are calculated are fixed, the system is able to calculate a feature vector for the interest point based on the distance between the location of the interest point and the location of the nearest grid points. In some embodiments, the feature vector for the interest point is computed as a weighted sum of the feature vectors at the nearest grid points where the weights are proportional to the distance. For example, if an interest point were equidistant between four neighboring grid points then the feature vector for the interest point would be the sum of the feature vectors for each of those grid points weighted by 0.25. In some embodiments, the nearest four grid points are used. However, in other embodiments, greater or fewer grid points could be used for computing the feature vector for the interest point.

Once the feature vector for the interest point is computed, the database can be searched for image(s) having a feature vector that is the closest to the interest point feature vector. For example, if the database stores forty-nine feature vectors for each image, then the computer system compares the interest point feature vector against the forty-nine feature vectors stored for each image. In some embodiments, the computer system determines how similar two feature vectors are based on the nearest Euclidian distance. A score proportional to the inverse of the distance can also be computed. Therefore, the computer system can identify the images having feature vectors with the closest distance or the highest score. The computer system can cap the number of images identified (e.g., the top ten images).

In some embodiments, the size or resolution (e.g., height and width in pixels) of the image is made to match the size of the images (in the catalog) used as input to the neural network so that the feature vectors for the catalog images and the input image encompass more or less the same area. The interest point can be chosen in the resized image itself such that both the interest point as well as the grid points lie in the same coordinate space. When an image is resized the coordinate space also changes. If an image is resized, then the coordinate of a point in the original image will change in the resized image. For example, if an image is resized to half of its original size, then a point at coordinate (100, 150) will change to the coordinate (50, 75) in the resized image. Now, if an interest point, e.g. (50, 60), is chosen in the original coordinate space, it needs to be transformed to (25, 30) in the resized co-ordinate space. However, if the interest point is chosen in the resized co-ordinate space itself (the point would be (25, 30)), then there is no need to transform it. In other embodiments, a mathematical mapping can be computed of the relationship between an interest point selected in the original and the resized input image. This mapping can be used to place the interest point with respect to the grid points and the coordinate space. In yet further embodiments, the user may not select an interest point. In these cases, the computer system can compare the similarity for all the feature vectors (such as an average or other statistical measure of all the feature vectors) computed for the input image against all the feature vectors stored (such as an average or other statistical measure of all the feature vectors) for each image in the catalog, which can be referred to herein as a "global search."

As will be described in further detail below, the disclosed technology can allow intellectual property rights holders to identify possible infringing items in a catalog using a training database that is not specifically customized for identifying their specific intellectual property and/or intellectual property generally. In other words, the training database can be a general-purpose database of images for training neural networks for image classification. In some embodiments, the neural network is trained on ImageNet, which is agnostic to any one intellectual property rights holder. Once possible infringing items are identified, they can be flagged for the intellectual property rights holder to investigate further.

FIGS. 1A-1E depict an example sequence of a user interface 100. With respect to FIG. 1A, the user interface 100 includes a representation of an input image 102 and user interface elements 104, 106, 108. As noted above, the input image 102 may be of an object that is considered by an intellectual property holder to be subject to the holder's visual intellectual property. A user can specify the input image 102 by using the file selector element 104. The user can upload a new input image using the upload element 106. As described below, a user can initiate a search with the search element 108. As described herein, the user interface 100 can be used to identify items in an electronic catalog that may be subject to visual intellectual property.

Figure 1B:
Figure 1C:
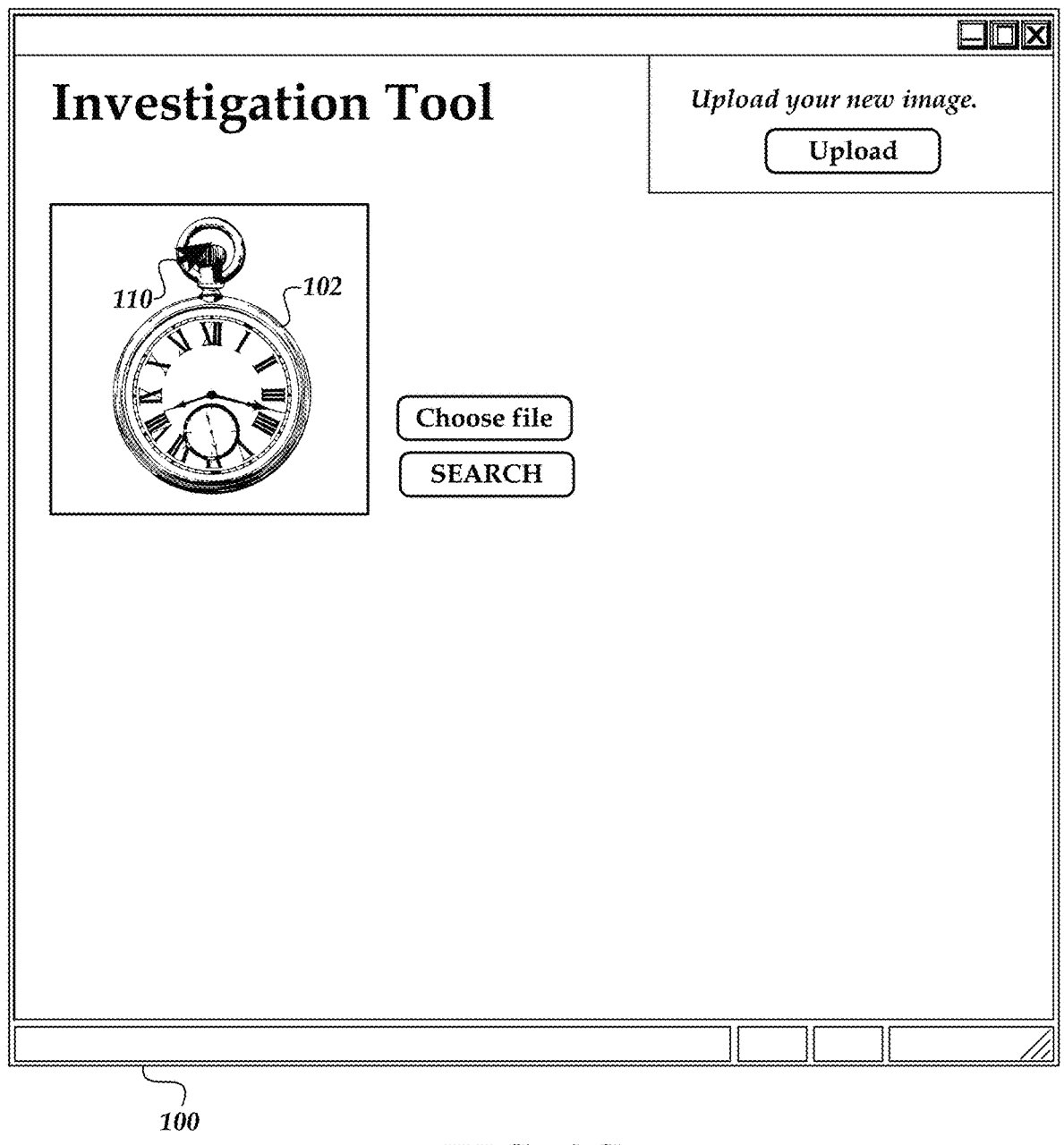
Figure 1D:
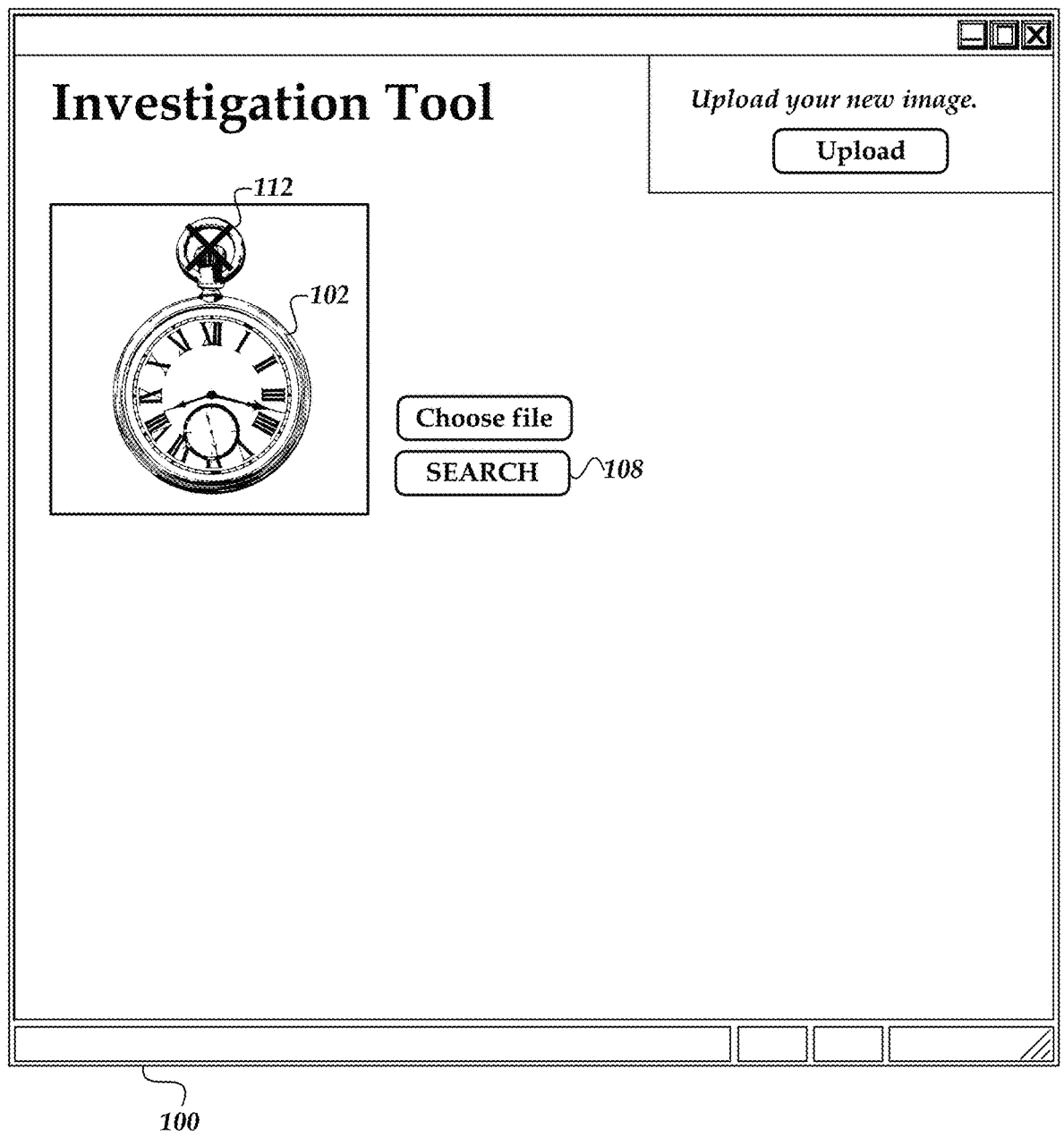

With respect to FIG. 1B, the depicted user interface 100 includes a movable selector 110. As described below with respect to FIG. 1C, the user can use the movable selector 110 to select one or more coordinates on the input image 102. In some embodiments, such as in the context of a touchscreen display, the movable selector 110 may be omitted and a user may select a portion of the input image 102 with touch input. In some embodiments, the coordinate(s) can be the location that was selected by the user. With respect to FIG. 1C, the depicted user interface 100 also includes the movable selector 110. As shown in FIG. 1C, a user can move the movable selector 110 to a location that is different from the location of the movable selector 110 shown in FIG. 1B. Thus, a user can identify locations on the image that can be used for searching. As described below with respect to FIG. 1D, the user can select a location on the input image 102 with the movable selector 110. As described herein, the user selection can include or can be a user selected area. With respect to FIG. 1D, the depicted user interface 100 includes a position indicator 112. In FIG. 1D, the user interface 100 can update to present the position indicator 112 at the user-selected location from FIG. 1C. Thus, the graphical user interface can visually indicate to the user the locations on the image that have been selected. The user can then select the search element 108 to initiate a search based on the input image 102 and a coordinate associated with the user-selected location depicted at the position indicator 112.

Figure 1E:
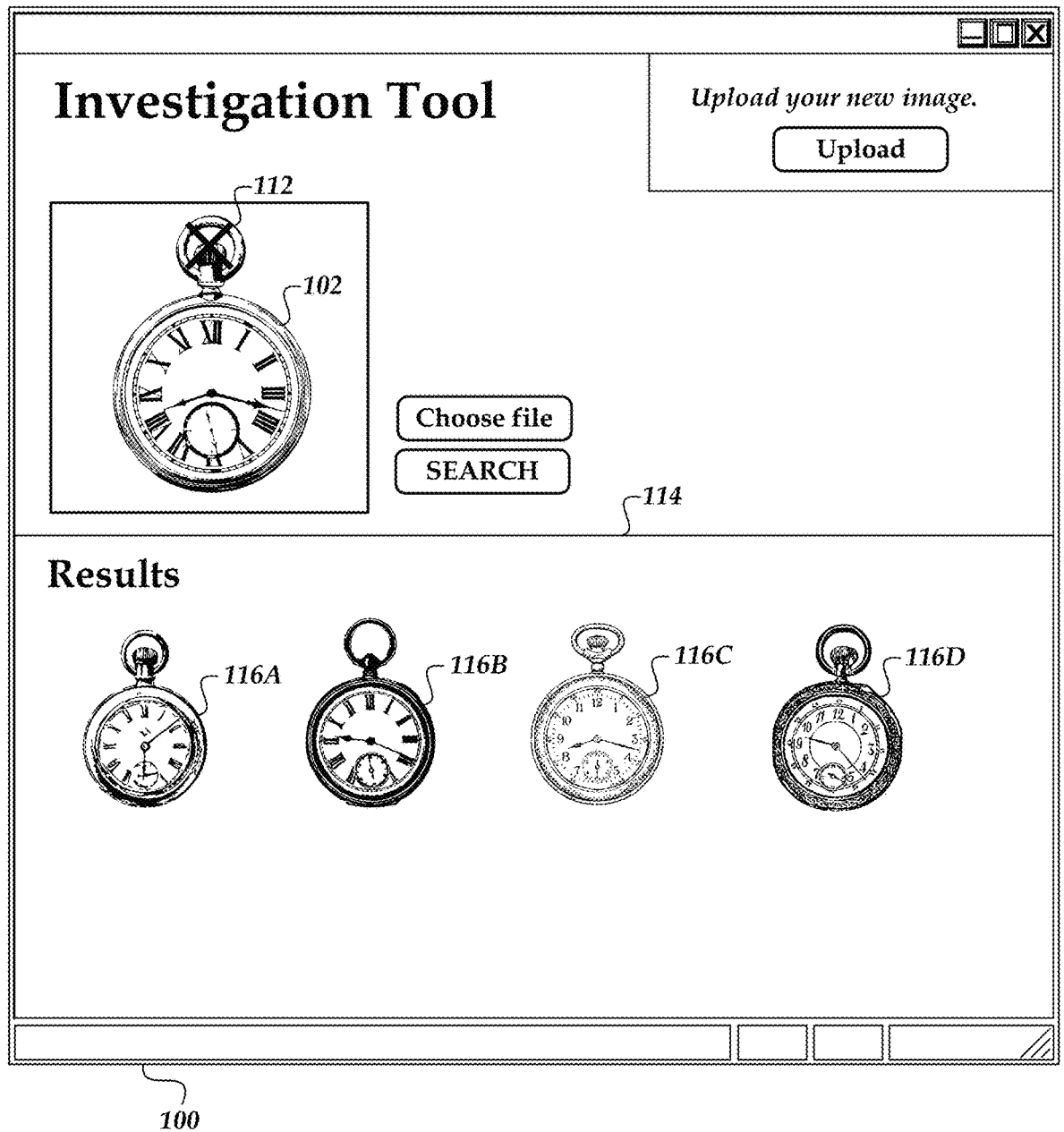

With respect to FIG. 1E, the depicted user interface 100 includes a search results area 114. The search results area 114 includes search result images 116A, 116B, 116C, 116D. As mentioned above with respect to FIG. 1D, the user selected the search element 108 that causes the search results area 114 to be presented in the user interface 100 of FIG. 1E. As shown, the search system can identify and present the search result images 116A, 116B, 116C, 116D based on the coordinate associated with the user-selected location depicted at the position indicator 112 and the overall appearance of the input image 102. In other words, the search system can identify and present the search result images 116A, 116B, 116C, 116D based on the feature or interest point selected by the user at the position indicator 112.

Figure 2:
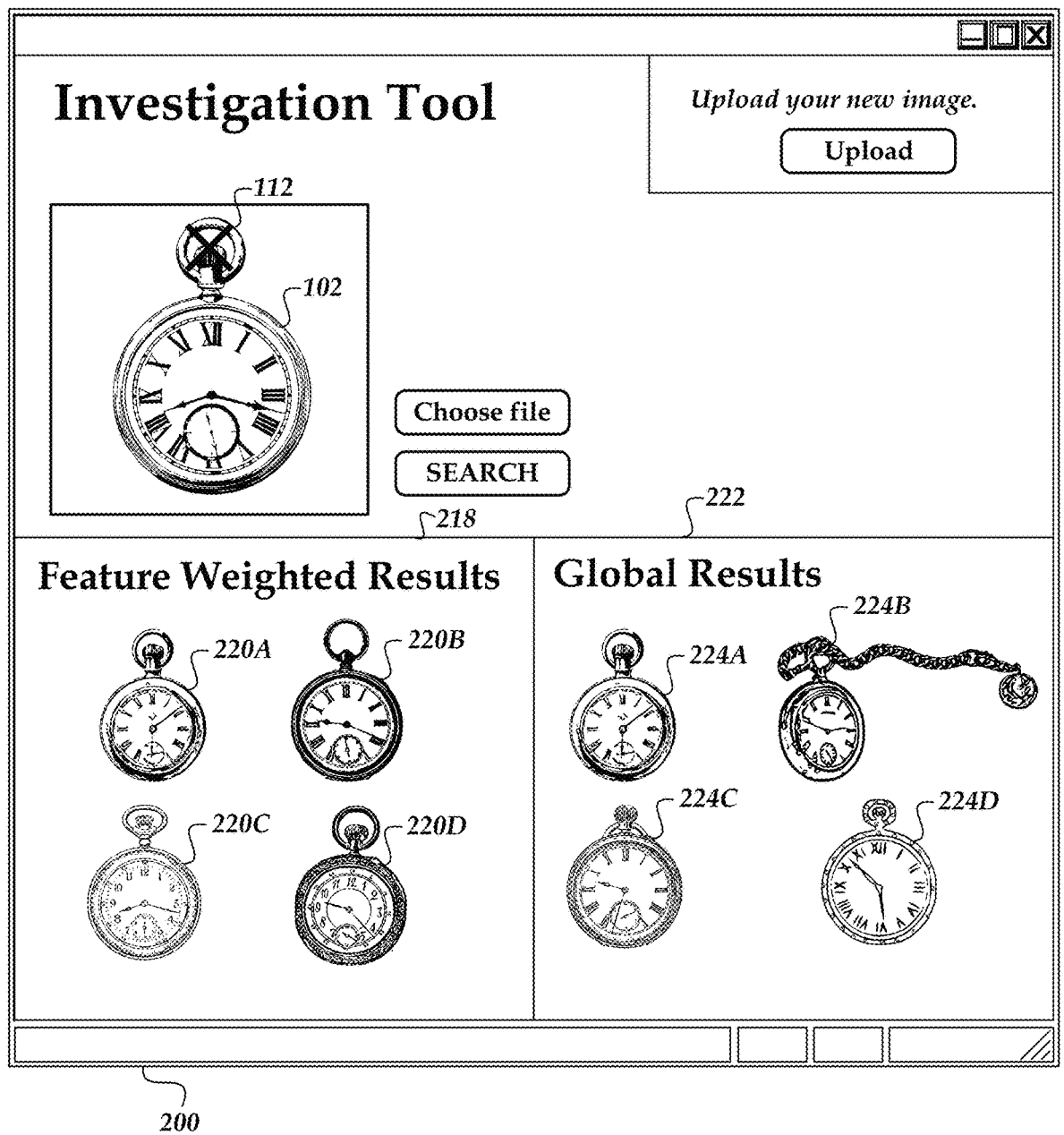
FIG. 2 is a pictorial diagram of another example user interface of the search system.

FIG. 2 depicts another example user interface 200. The user interface 200 of FIG. 2 can be similar to the user interface 100 of FIG. 1E. However, unlike the user interface 100 of FIG. 1E, the user interface 200 of FIG. 2 includes a first search results area 218 and a second search results area 222. As described herein, the search system can search for images that most closely match the input image with an emphasis placed on the user identified interest point to determine a first set of search result images 220A, 220B, 220C, 220D shown in the first search results area 218. The search system can determine a second set of search result images 224A, 224B, 224C, 224D based on the overall appearance of the input image 102 and the appearance of the second set of search result images 224A, 224B, 224C, 224D, which are shown in the second search results area 222. The search for the second search results area 222 (a "global results") can be referred to herein as a "global search." In some embodiments, the user interface 200 of FIG. 2 can be presented in response to the selection of the search element 108 of FIG. 1D.

FIG. 3 depicts a search results user interface 300. In some embodiments, the user interface 300 of FIG. 3 can be presented in response to the selection of the search element 108 of FIG. 1D. The search results user interface 300 of FIG. 3 includes a search results area 314 that displays the item search results in a table format. The search results area 314 can present metadata associated with items, such as an item identifier, a title, and an entity (such as a merchant of the item), which are shown in FIG. 3. The metadata information can allow a user to analyze the search results. The user interface 300 includes user interface elements 302A, 302B, 302C, 302D, 302E, 302F, 302G that enable a user to copy item identifiers, copy titles, copy entities, copy all metadata, export to a comma separated value file, select all search results, and deselect all search results, respectively. The user interface elements 302A, 302B, 302C, 302D, 302E, 302F, 302G further allow a user to investigate the search results.

Figure 4A:
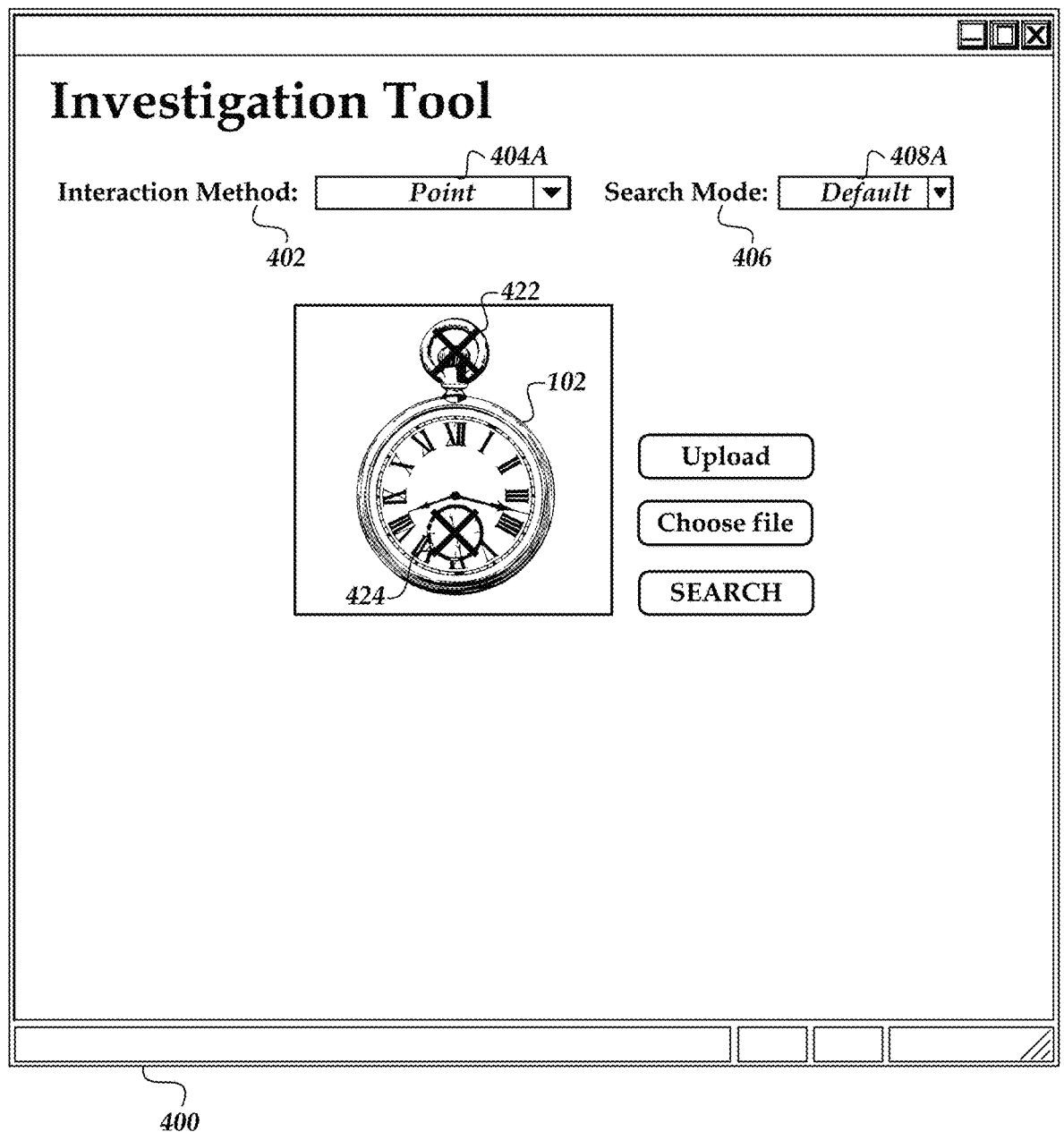
FIGS. 4A-4C are pictorial diagrams of yet another example user interface of the search system.
Figure 4B:
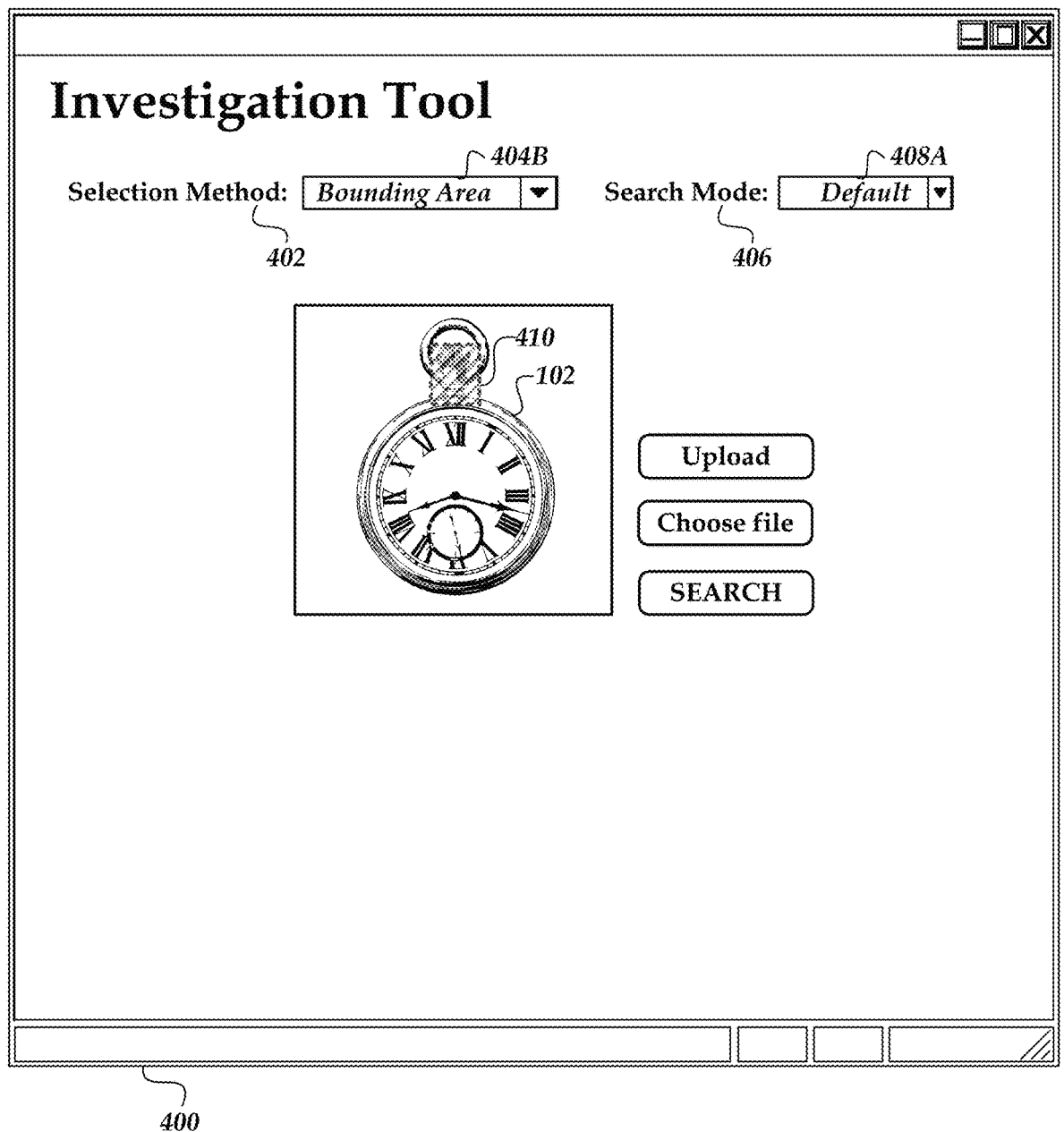
Figure 4C:
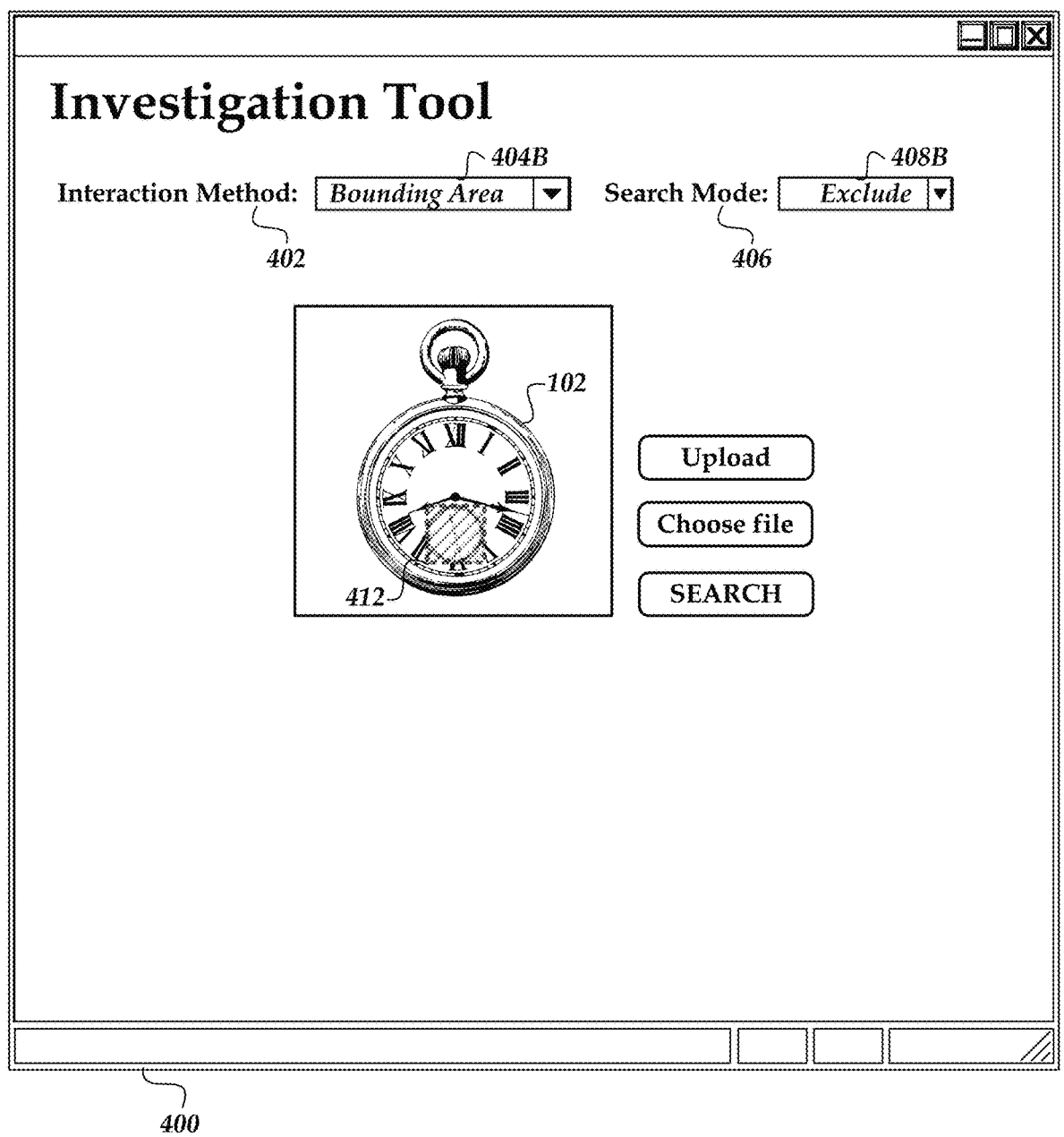

FIGS. 4A-4C depict another example sequence of a user interface 400. The user interface 400 of FIG. 4A can be similar to the user interface 100 of FIG. 1D. However, unlike the user interface 100 of FIG. 1D, the user interface 400 of FIG. 4A includes an interaction method element 402 and a search mode element 406. User selection of either or both of the interaction method element 402 and the search mode element 406 can alter how the search system performs searches. As discussed below with respect to FIG. 4B, a user can change the interaction method element 402 from the point option 404A. As discussed below with respect to FIG. 4C, a user can change the search mode element 406 from the default option 408A. The default option 408A can indicate that the search system should give higher relevance to any user selected feature(s) when searching item images.

In some embodiments, as shown in FIG. 4A, the user interface 400 can receive multiple user selections (i.e., interest points) relative to the input image 102. As shown, the user interface 400 presents the indicators 422, 424 as overlaid on the input image 102, which can correspond to respective user selections. As described herein, the search system can search item images based on multiple coordinates associated with the user selections. For example, the search system can search item images based on multiple features.

Turning to FIG. 4B, a user can change the interaction method element 402 of the user interface 400 to the bounding area option 404B. Thereafter, instead of selecting a position with a click, for example, a user can select the bounding area 410, such as a bounding box. In some embodiments, a user can resize the bounding area 410. While the bounding area 410 is shown as a rectangle, other bounding area shapes may be supported in certain embodiments. As described herein, the search system can weight the features within the bounding area 410 higher than the remaining areas of the input image 102.

Turning to FIG. 4C, a user can change the search mode element 406 of the user interface 400 to the exclude option 408B. Thereafter, the search system can perform a search that ignores features within the bounding area 412 of the input image 102. In other words, the search system can perform a search that matches on images irrespective of the features associated with the bounding area 412. While not shown, the exclude option 408B search can be performed with the point option 404A. Thus, the user interface 400 of FIGS. 4A-4C provides additional user interface options to the user for investigating whether an object visible in an image is subject to a type of visual intellectual property.

Figure 5:
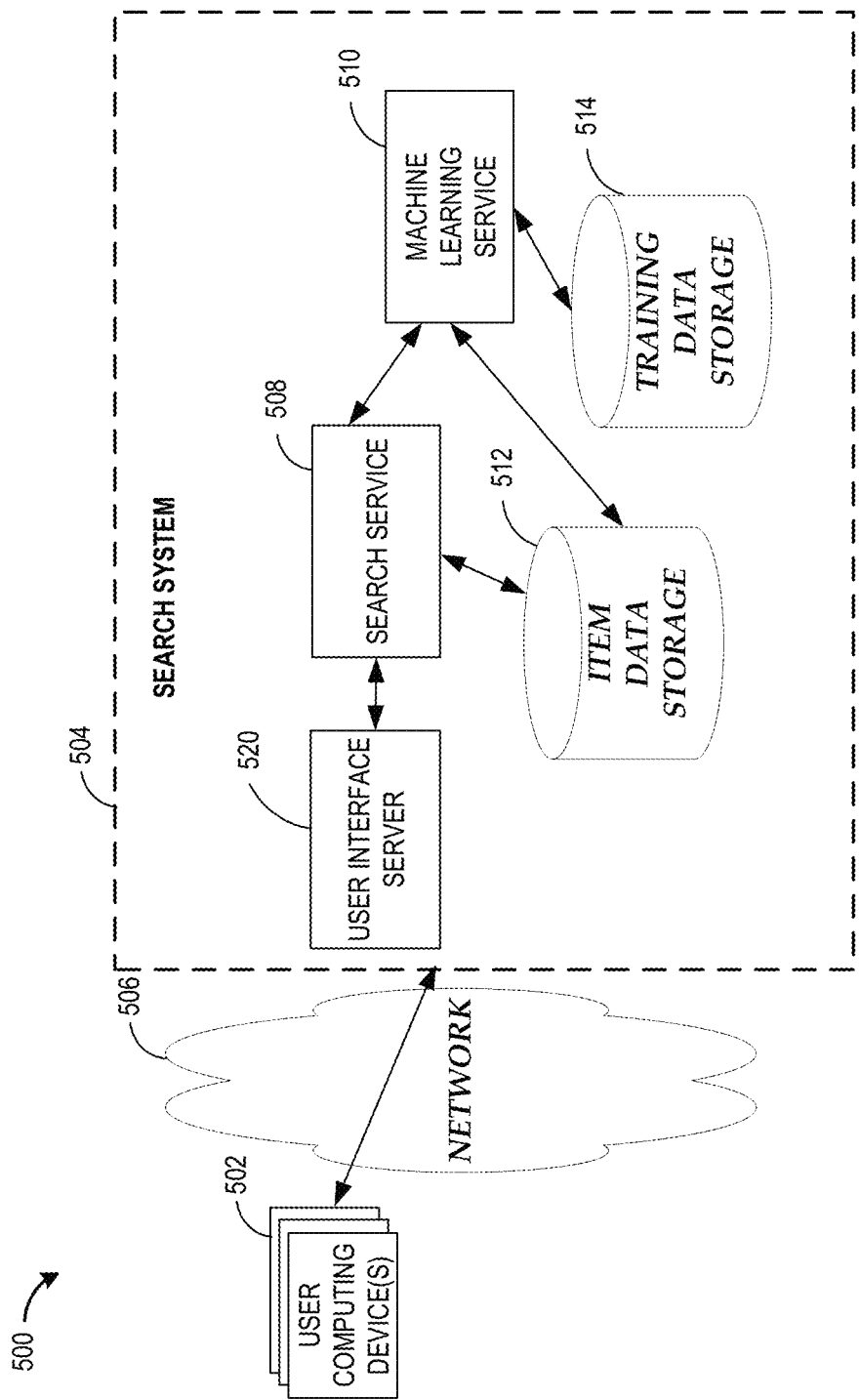
FIG. 5 is a schematic block diagram depicting an illustrative network environment for implementing a search system.

Turning to FIG. 5, an illustrative network environment 500 is shown in which a search system 104 may enable investigating whether an object visible in an image is subject to a type of visual intellectual property. The network environment 500 may include one or more user computing devices 502 and the search system 504. The search system 504 may include a user interface server 520, a search service 508, a machine learning service 510, an item data storage 512, and a training data storage 514. The constituents of the network environment 500 may be in communication with each other either locally or over a network 506. While certain constituents of the network environment 500 are depicted as being in communication with one another, any constituent of the network environment 500 can communicate with any other constituent of the network environment 500; however, not all of these communication lines are depicted in FIG. 5. For example, the search service 116 can communicate with the training data storage 114.

The machine learning service 510 can use and/or train machine learning models, such as neural networks, based on item images. The machine learning service 510 can communicate with the item data storage 512 and/or the training data storage 514.

Example user computing devices 502 can include a laptop or tablet computer, personal computer, personal digital assistant (PDA), hybrid PDA/mobile phone, smart wearable device (such as a smart watch), mobile phone, and/or a smartphone. A user can submit, via the user computing device 502 and the user interface server 520, a search to the search system 504. The search service 108 and/or the machine learning service 510 can process the input image to extract features. The machine learning service 510 can extract features from the item images from the item data storage 512. The search service 108 can rank the search results using a nearest neighbor algorithm. Users, via the user computing device 102, can further interact with the user interface server 520 as described herein.

In some embodiments, the search system 504 can be administered by an electronic catalog provider. For example, merchants of the electronic catalog provider can list items on the electronic catalog. Accordingly, the users can be representatives of the intellectual property holders that are interested in searching for items on the electronic catalog that are associated with images that contain visible objects that are subject to a type of visual intellectual property. By using the search system 504, the users can identify and flag items for review by the electronic catalog provider such that some action can be taken.

In some embodiments, an electronic catalog system, as described herein, may include or be in communication with a data store of information about items (such as the item data storage 512) that may be listed for sale, lease, etc. by an electronic marketplace, sellers, merchants and/or other users. The item information in this data store may be viewable by end users through a browsable or searchable electronic catalog in which each item may be described in association with a network page, such as an item detail page, describing the item. Each item detail page may include, for example, an item image and description, customer ratings, customer and professional reviews, sales rank data, lists of related items, and/or other types of supplemental data that may assist consumers in making informed purchase or acquisition decisions. A network page can be provided that enables users to interact with items, such as selecting, acquiring, or consuming items (such as watching or playing a media content item). Users of the system may, in some embodiments, locate specific item detail pages within the electronic catalog by executing search queries, navigating a browse tree, and/or using various other navigation techniques.

The item data storage 512 and/or the training data storage 514 may be embodied in hard disk drives, solid state memories, or any other type of non-transitory computer-readable storage medium. The item data storage 512 and/or the training data storage 514 may also be distributed or partitioned across multiple local and/or remote storage devices. Each of the item data storage 512 and/or the training data storage 514 may include a data store. As used herein, in addition to its ordinary and customary meaning, a "data store" can refer to any data structure (and/or combinations of multiple data structures) for storing and/or organizing data, including, but not limited to, relational databases (e.g., Oracle databases, MySQL databases, etc.), non-relational databases (e.g., NoSQL databases, etc.), key-value databases, in-memory databases, tables in a database, comma separated values (CSV) files, eXtendible markup language (XML) files, TeXT (TXT) files, flat files, spreadsheet files, and/or any other widely used or proprietary format for data storage.

The network 506 may be any wired network, wireless network, or combination thereof. In addition, the network 506 may be a personal area network, local area network, wide area network, cable network, satellite network, cellular telephone network, or combination thereof. In addition, the network 506 may be an over-the-air broadcast network (e.g., for radio or television) or a publicly accessible network of linked networks, possibly operated by various distinct parties, such as the Internet. In some embodiments, the network 506 may be a private or semi-private network, such as a corporate or university intranet. The network 506 may include one or more wireless networks, such as a Global System for Mobile Communications (GSM) network, a Code Division Multiple Access (CDMA) network, a Long Term Evolution (LTE) network, or any other type of wireless network. The network 506 can use protocols and components for communicating via the Internet or any of the other aforementioned types of networks, such as HTTP. Protocols and components for communicating via the Internet or any of the other aforementioned types of communication networks are well known to those skilled in the art of computer communications and thus, need not be described in more detail herein.

The user computing devices 502 and the search system 504 may each be embodied in a plurality of devices. For example, the user computing devices 502 and the search system 504 may include a network interface, memory, hardware processor, and non-transitory computer-readable medium drive, all of which may communicate with each other by way of a communication bus. The network interface may provide connectivity over the network 506 and/or other networks or computer systems. The hardware processor may communicate to and from memory containing program instructions that the hardware processor executes in order to operate the user computing devices 502 and the search 504. The memory generally includes RAM, ROM, and/or other persistent and/or auxiliary non-transitory computer-readable storage media.

Additionally, in some embodiments, the search system 504 or components thereof are implemented by one or more virtual machines implemented in a hosted computing environment. The hosted computing environment may include one or more rapidly provisioned and/or released computing resources. The computing resources may include hardware computing, networking and/or storage devices configured with specifically configured computer-executable instructions. A hosted computing environment may also be referred to as a "serverless," "cloud," or distributed computing environment.

Figure 6:
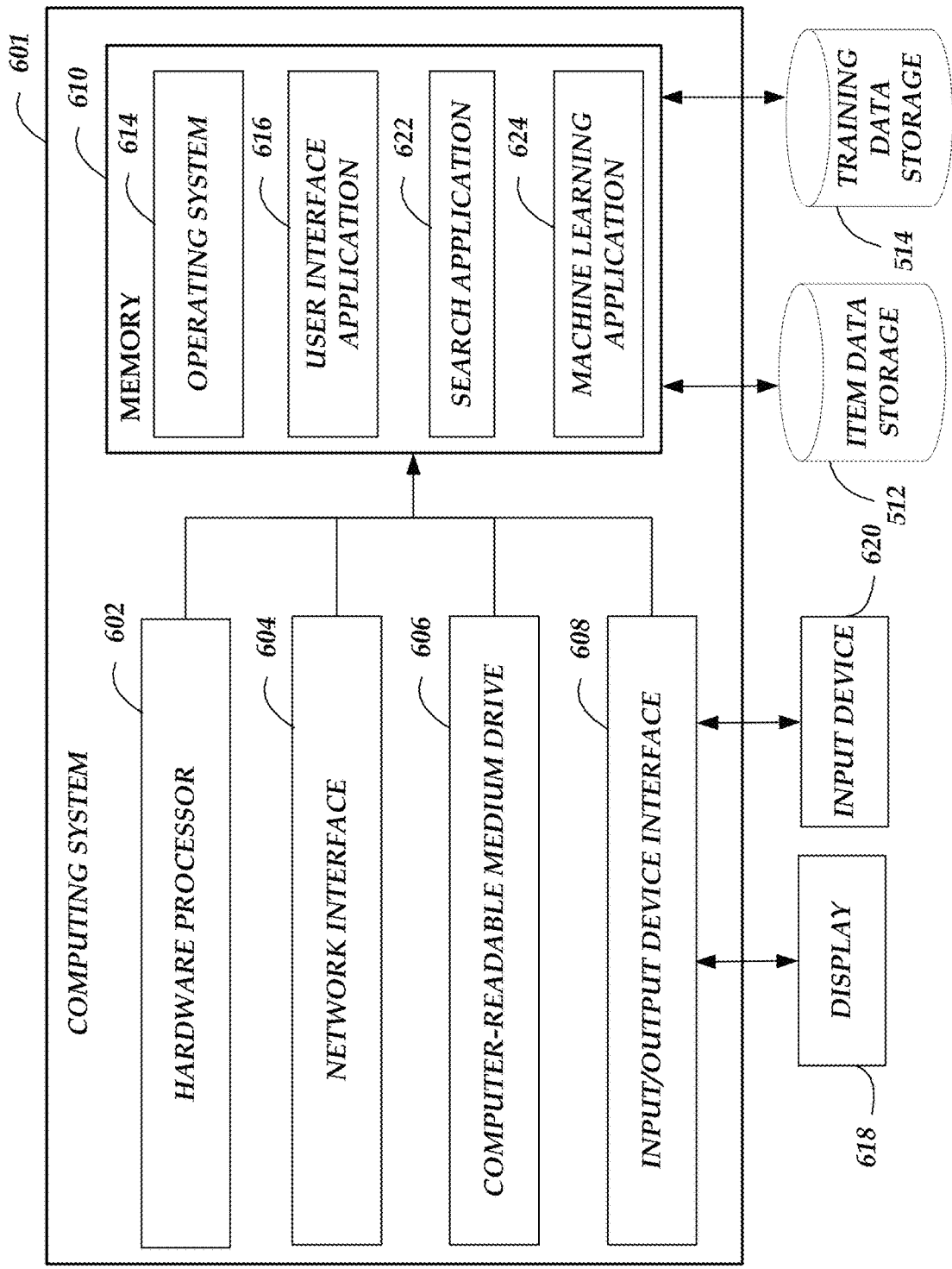
FIG. 6 is a schematic diagram depicting an illustrative general architecture of a computing system for implementing the user interface server, search service, and/or machine learning service referenced in the network environment depicted in FIG. 5.

FIG. 6 is a schematic diagram of an illustrative general architecture of a computing system 601 for implementing the user interface server 520, the search service 508, and/or the machine learning service 510 referenced in the environment 500 in FIG. 5. While the general architecture of the computing system 601 is shown and described with respect to FIG. 5, the general architecture of FIG. 5 can be used to implement other services and/or devices described herein, such as the user computing device 502. Those skilled in the art will appreciate that the computing system 601 may include more (or fewer) components than those shown in FIG. 6. Further, other computing systems described herein may include similar implementation arrangements of computer hardware and software components.

The computing system 601 for implementing the user interface server 520, the search service 508, and/or the machine learning service 510 may include a hardware processor 602, a network interface 604, a non-transitory computer-readable medium drive 606, and an input/output device interface 608, all of which may communicate with one another by way of a communication bus. As illustrated, the computing system 601 is associated with, or in communication with, an optional display 618 and an optional input device 620. In other embodiments, the display 618 and input device 620 may be included in the user computing devices 502 shown in FIG. 5. The network interface 604 may provide the computing system 601 with connectivity to one or more networks or computing systems. The hardware processor 602 may thus receive information and instructions from other computing systems or services via the network 506. The hardware processor 602 may also communicate to and from memory 610 and further provide output information for an optional display 618 via the input/output device interface 608. The input/output device interface 608 may accept input from the optional input device 620, such as a keyboard, mouse, digital pen, touch screen, accelerometer, gyroscope, or gestures recorded via motion capture and/or image recognition (e.g., eye, hand, head, and/or body part placement and/or recognition). The input/output device interface 620 may also output audio data to speakers or headphones (not shown).

The memory 610 may contain specifically configured computer program instructions that the hardware processor 602 executes in order to implement one or more embodiments of the user interface server 520, the search service 508, and/or the machine learning service 510. The memory 610 generally includes RAM, ROM and/or other persistent or non-transitory computer-readable storage media. The memory 610 may store an operating system 614 that provides computer program instructions for use by the hardware processor 602 in the general administration and operation of the user interface server 520, the search service 508, and/or the machine learning service 510. The memory 610 may further include other information for implementing aspects of the user interface server 520, the search service 508, and/or the machine learning service 510. For example, the memory 610 may communicate with the item data storage 512 and/or the training data storage 514. In some embodiments, the item data storage 512 and/or the training data storage 514 may store one or more data structures or objects that can also be loaded into the memory 610.

The memory 610 may include a user interface application 616 that may be executed by the hardware processor 602 to implement user interfaces of the search system 504. The memory 610 may include a search application 622 that may be executed by the hardware processor 602 conduct searches. The memory 610 may include a machine learning application 616 that may be executed by the hardware processor 602. In some embodiments, the machine learning application 616 may implement various aspects of the present disclosure. For example, the machine learning application 616 may train or use a machine learning model, such as a neural network, to extract features from images.

Figure 7:
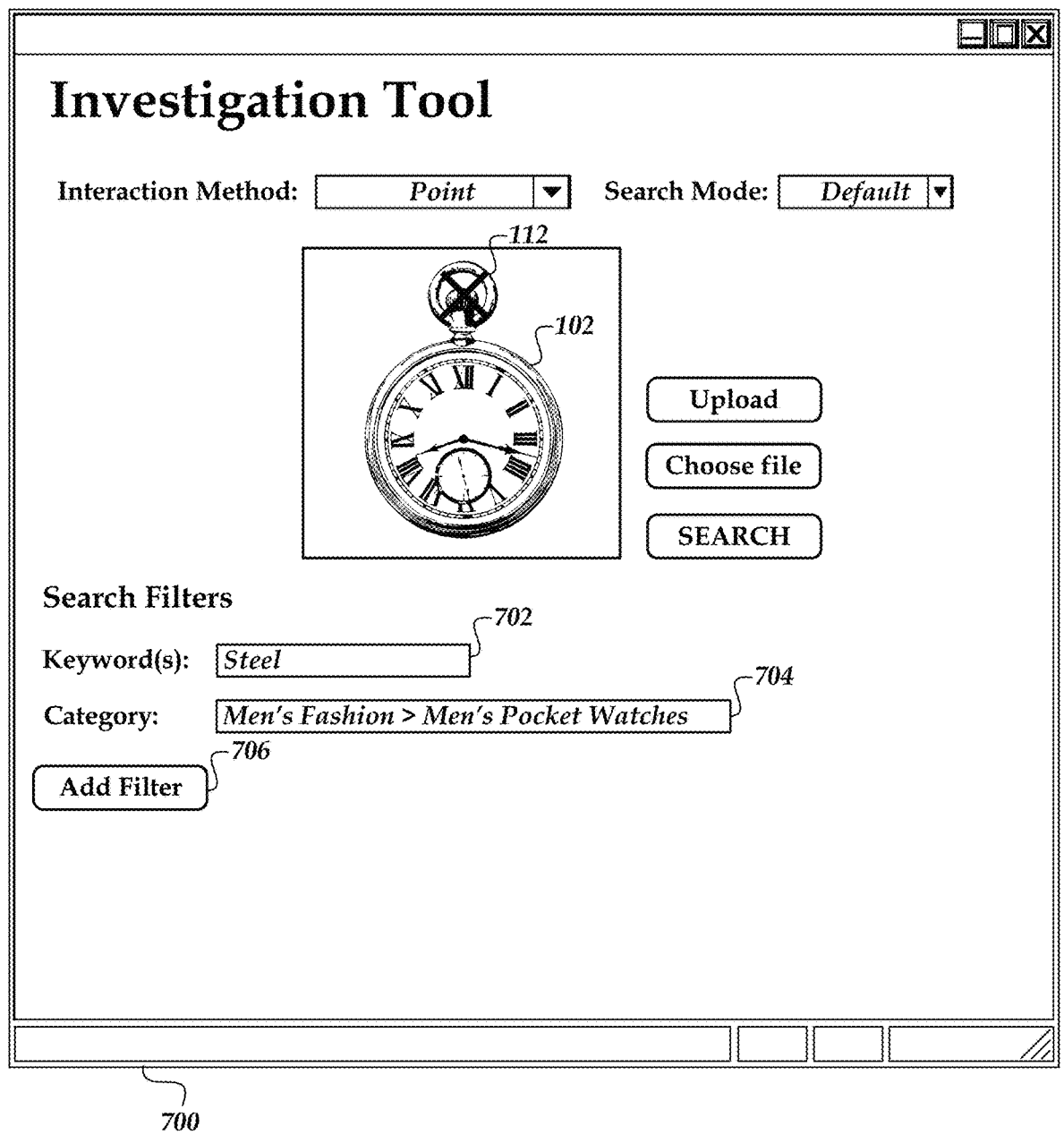
FIG. 7 is a pictorial diagram of yet another example user interface of the search system.

FIG. 7 depicts yet another example user interface 400. The user interface 700 of FIG. 7 can be similar to the user interface 400 of FIG. 4A. However, unlike the user interface 400 of FIG. 4A, the user interface 700 of FIG. 7 includes metadata filters 702, 704. In addition to user selection of feature(s) with respect to the input image 102, the user interface 700 can allow a user to further filter search results based on the filters 702, 704. For example, a user can specify one or more keywords with the keyword filter 702 to further filter the search results where the specified keyword (or a related word) appears in metadata for an item (here the example keyword is "Steel"). As another example, a user can specify one or more categories with the category filter 704 to further filter the search results to include items assigned to the specified category (here "Men's Fashion>Men's Pocket Watches"). A user can specify additional metadata filters with the add filter user interface elements 706. In some embodiments, metadata filters can be exclusionary. For example, an exclusionary metadata filter can exclude search results where the exclusionary metadata filter is applicable. Accordingly, the user can use the user interface 700 to narrow down the search results while investigating whether an object visible in an image is subject to a type of visual intellectual property.

Figure 8:
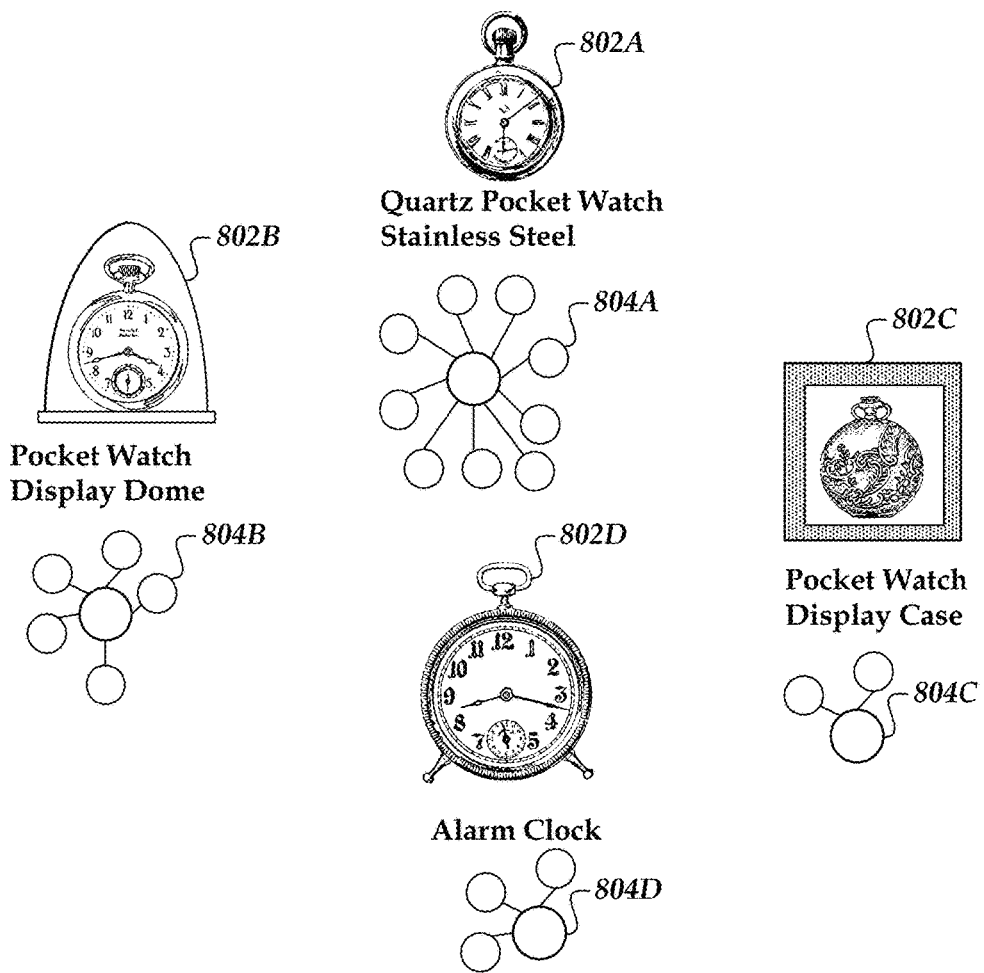
FIG. 8 is a pictorial diagram of another example search results user interface of the search system.

FIG. 8 depicts another search results user interface 800. In some embodiments, the user interface 800 of FIG. 8 can be presented in response to the selection of the search element 108 of FIG. 1D. The search results user interface 800 of FIG. 8 can be a consolidated results user interface. For example, instead of displaying every search result in a detailed manner, the search system 504 can present groups of items in a concise matter with a representative item and/or item image for each group. As shown, the consolidated results user interface 800 presents representative item images 802A, 802B, 802C, 802D and group representations 804A, 804B, 804C, 804D. With respect to identifying whether an object visible in an image is subject to a type of visual intellectual property, the consolidated results user interface 800 can allow user to efficiently review the search results. For example, the image searching of the search system 504 may inadvertently identify incorrect item types where the item images share similarities with the input image. Continuing with the example, if the intellectual property at issue covers a particular type of item, such as a pocket watch, then other types of items can be ignored by the user, such as display products for the pocket watch or other types of devices like alarm clocks. In some embodiments, the groups of items can be clusters, as shown by the group representations 804A, 804B, 804C, 804D. As described herein, the clusters can be based on some combination of metadata (for example, a shared item category) or based on similarity of item images. In some embodiments, a user can review individual items within each group by selecting one of the group representations 804A, 804B, 804C, 804D.

Figure 9A:
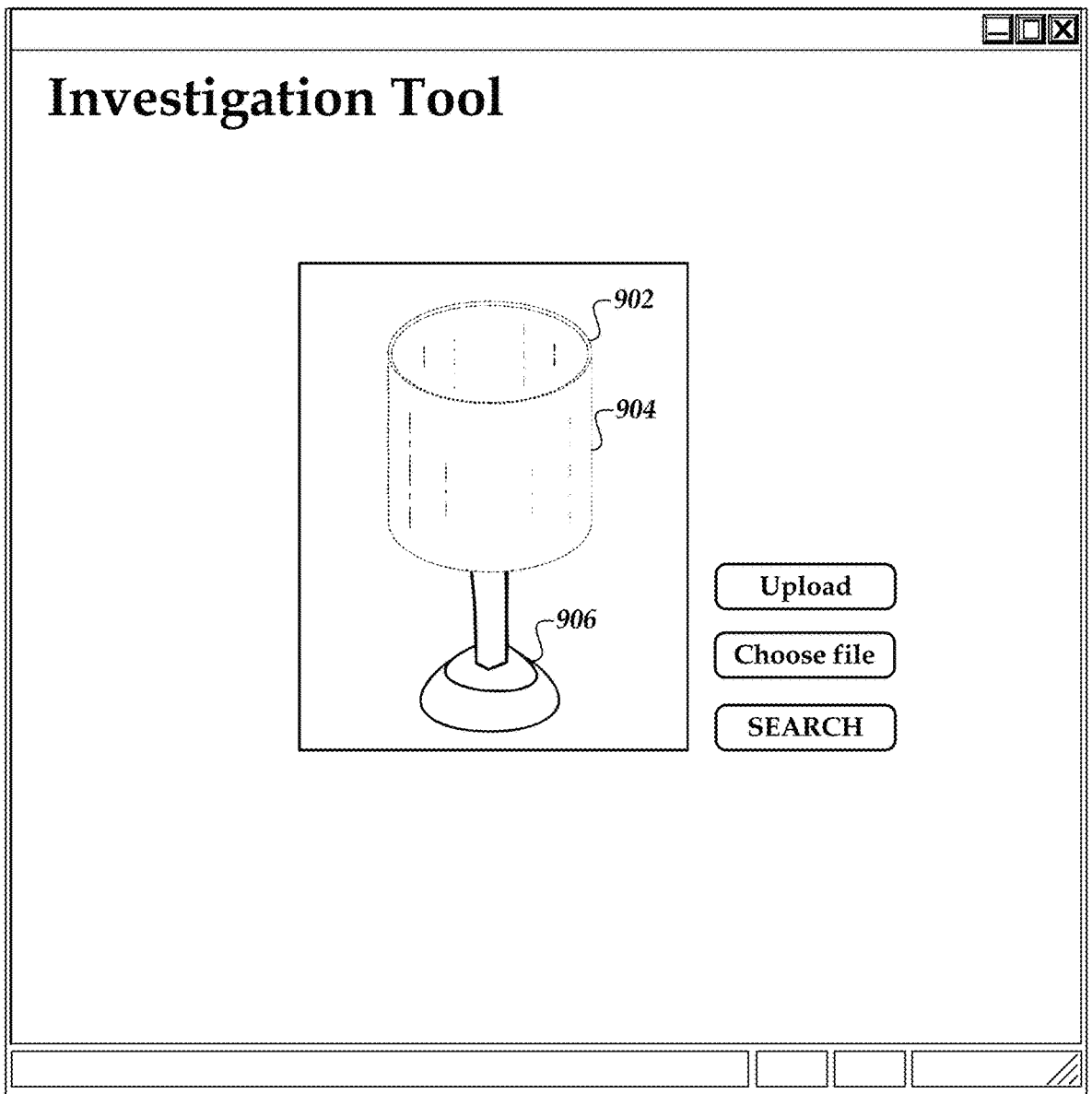
FIG. 9A-9B are pictorial diagrams of additional example user interfaces of the search system.

FIG. 9A depicts another example user interface 900. The user interface 900 of FIG. 9A can be similar to the user interface 400 of FIG. 4A. However, in one respect, unlike the input image 102 400 of FIG. 4A that can be the image of a product covered by intellectual property, the input image 902 of FIG. 9A can be a line drawing that is used in an intellectual property grant or application, such as a design patent, a design application, or a design registration. Accordingly, the input image 902 can include a broken line portion 904 and a solid line portion 906. Under certain intellectual property, the claim of the intellectual property can be specified by the solid line portion 906 and the broken line portion 904 can be unclaimed. As described herein, the search system 504 can search for features in item images specified by the solid line 906 of the input image 902.

Figure 9B:
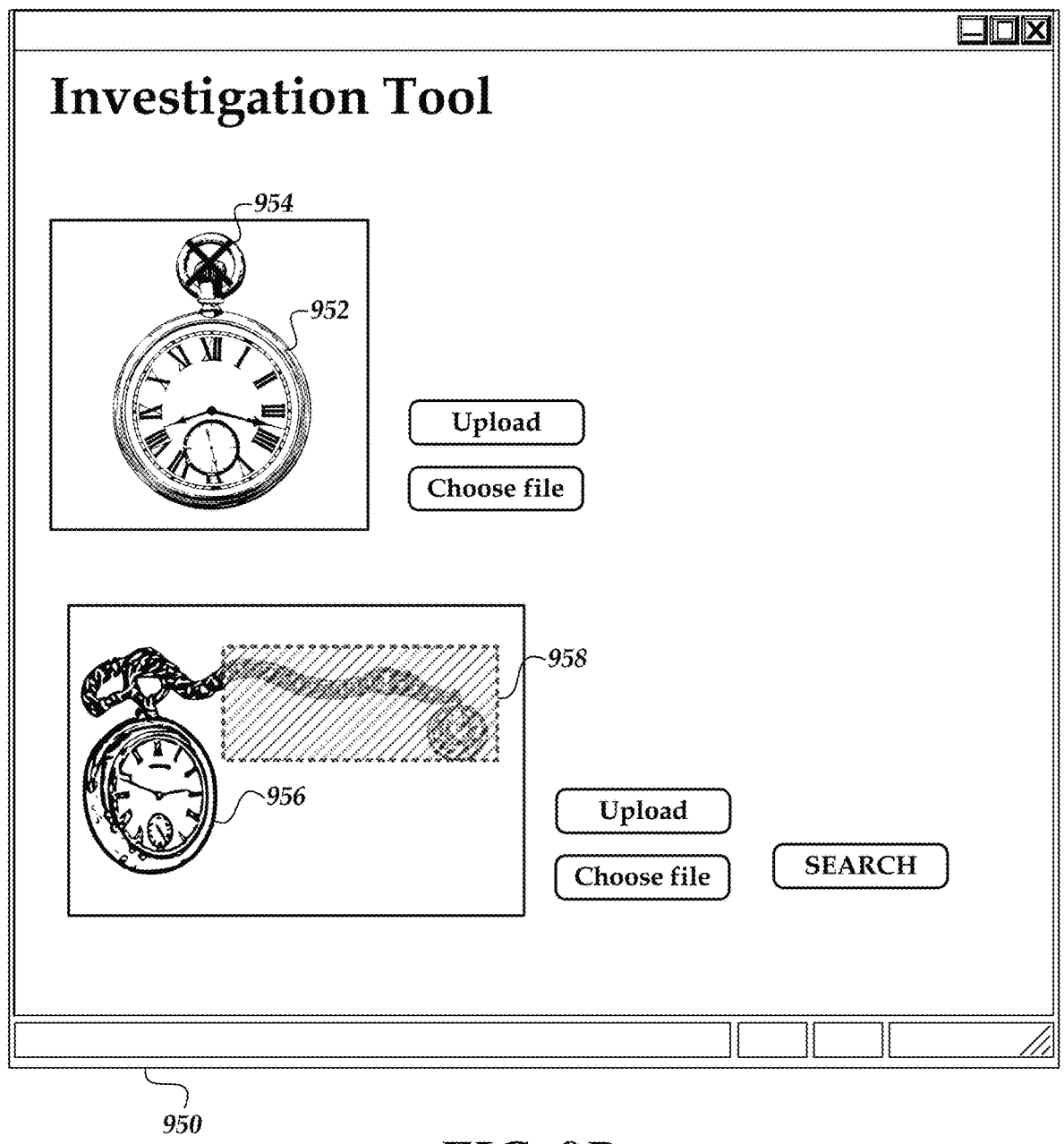

FIG. 9B depicts yet another example user interface 950. The user interface 950 of FIG. 9B can be similar to other user interfaces described herein. However, unlike some other user interfaces described herein that show a single input image, the user interface 950 can include multiple input images 952, 958. In particular, a user has selected a first user selected area 954 of the first input image 952, and the user has selected a second user selected area 958 of the second input image 958. Accordingly, the search system 504 can retrieve search results based on features of the first user selected area 954, the first input image 952, the second user selected area 958, and the second input image 958. As described herein, the search system 504 can retrieve a first set of search results for the first input image 952 and a second set of search results for the second input image 958. The search system 504 can then combine the search results to produce a single ranked list. Thus, an item with an item image that has high feature relevance to both the first user selected area 954 and the second user selected area 958 would rank highly on the list.

Figure 10:
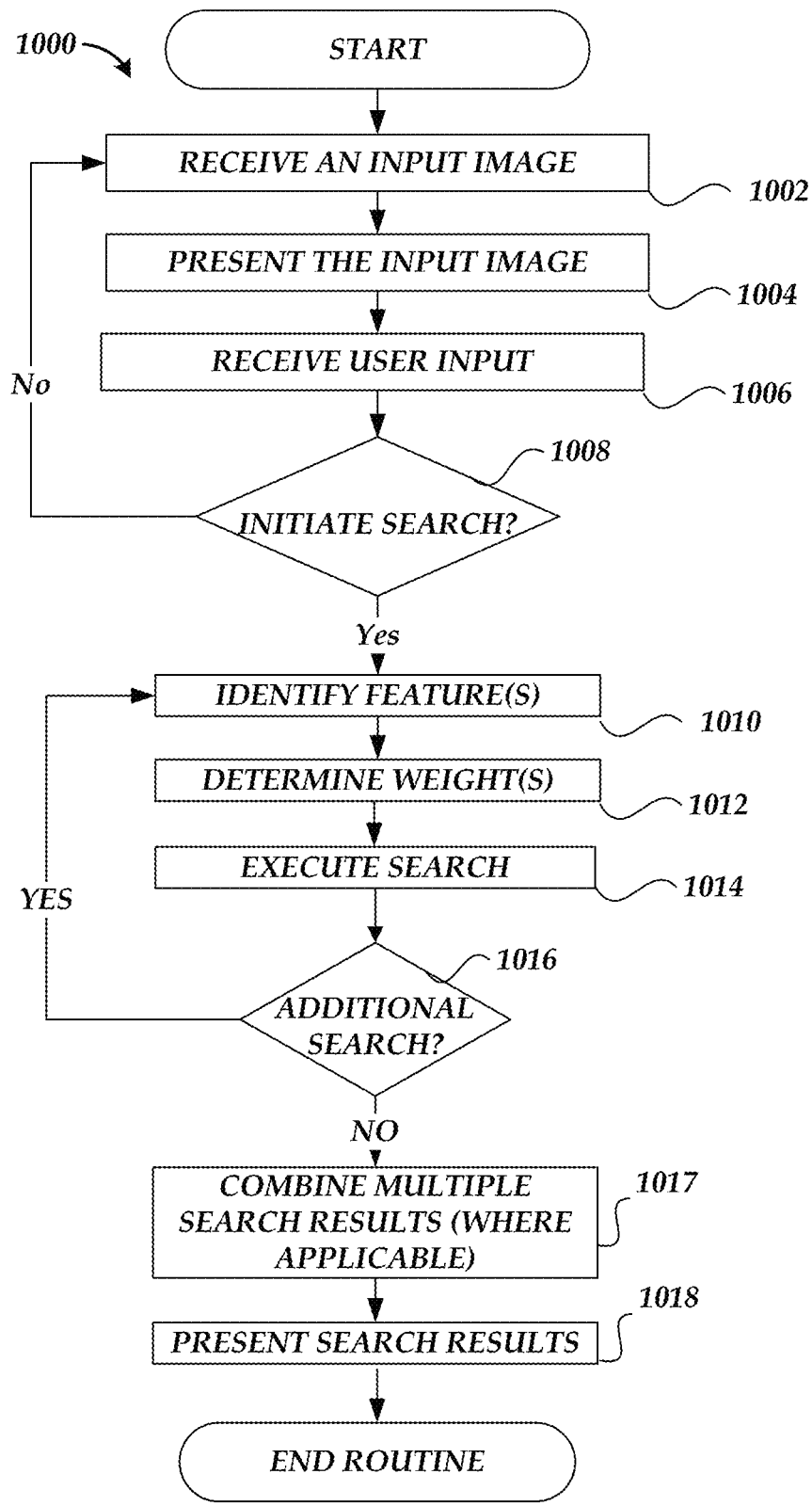
FIG. 10 is a flow chart depicting an example method for providing user interfaces related to searching item images.

FIG. 10 is a flow diagram depicting an example method 1000 implemented by the search system 504 for providing user interfaces related to searching item images. As described herein, the search system 504 may include the user interface server 520. In some embodiments, the user interface server 520 may include the user interface application 616, and may implement aspects of the method 1000. The search system 504 may include the search service 508. In some embodiments, the search service 508 may include the search application 622, and may implement aspects of the method 1000. Some aspects of the method 1000 may be implemented by other components of the search system 504, such as the machine learning service 510.

Beginning at block 1002, an input image can be received. In particular, the user interface server 520 can receive the input image. For example, as described above with respect to FIG. 1A, a user can upload a new input image using the upload element 106 and the user interface 100 can receive the new input image. As described herein, the input image can depict an item subject to visual intellectual property, such as a design patent. For example, the intellectual property owner can produce a product and the intellectual property owner's intellectual property can be directed towards the product. Thus, as described herein, the search system 504 can use an image of the product to identify whether an object or design feature that is visible in another image is subject to a type of visual intellectual property for further review by an entity or a user. The input image 102 of FIG. 1A can be an example of an image that depicts an item covered by a design patent claim.

In some embodiments, the input image can be a line drawing, such as a line drawing from a design patent, a design patent application, or a design registration. Line drawings can include solid lines. Line drawings can also include broken lines. Under many jurisdictions, the solid line indicates the intellectual property coverage and the broken line can be unclaimed subject matter. The input image 902 of FIG. 9A can be an example of a line drawing. The line drawing image 902 can include a solid line portion 906 and a broken line portion 904. A user can use the line drawing to identify whether an object or design feature that is visible in an item image from an electronic catalog is subject to a type of visual intellectual property.

At block 1004, the input image can be presented. In particular, the user interface server 520 can cause the input image to be presented. Example presentations of input images are shown in the user interfaces 100, 900 described above with respect to FIGS. 1A and 9. As described herein, a user can interact with the presented input image. For example, a user can select a point or portions of the presented input image to identify features for searching.

At block 1006, user input can be received. In particular, the user interface server 520 can receive user input. Example user input can be a user selection associated with a coordinate relative to the input image. As described above with respect to FIGS. 1B-1C, a user can move a movable selector 110 to different points on the input image 102. As described above with respect to FIG. 1D, a user can select a location on the input image 102 as indicated by the position indicator 112, which is associated with a coordinate. An example coordinate can be an x-axis and a y-axis coordinate relative to the input image. As described herein, the user selection can be used by the search system 504 to search for features in objects visible in images that are the subject to a type of visual intellectual property.

The user selection can include a user selected area relative to the input image. For example, by selecting a point on the input image, the search system 504 can block an area, such as the area covered by the position indicator 112 in FIG. 1D. The area corresponding to a point selection can be a predefined area size. The coordinate associated with the user selection can define a boundary point of the user selected area. Additionally or alternatively, the user selected area can be a bounding area, such as the bounding area 410 described above with respect to FIG. 4B.

Additional example user input can be user interface options selected by the user. For example, as described above with respect to FIGS. 4A and 4B, a user can change the interaction method 502 of interacting with the input image 102. For example, a user can select a particular point on the input image or can select a user specified area. As described above with respect to FIGS. 4B and 4C, the search mode 406 can be a default option 408A or an exclude option 408B. As described above, the selection of the default option 408A can indicate that the search system 504 should give higher relevance to any user selected feature(s) when searching item images. Also as described above, the selection of exclude option 408B can indicate that the search system 504 should ignore feature(s) that are present at the coordinate and/or user selected area.

Additional example user input can be metadata filters. For example, as described above with respect to FIG. 7, a user can specify the metadata filters 702, 704, which can be used in conjunction with user selected input image features. An example metadata filter can be a keyword filter 702 that filters items based on respective metadata that has the keyword or a related word. Another example metadata filter can be a category filter 704 that filters items based on one or more categories associated with items. Any other type of metadata associated with an item can be filtered by the search system 504. Metadata filters can be inclusionary, i.e., cause the search system 504 to include items that match the metadata filter(s) while excluding other items that do not match the metadata filter(s). Conversely, metadata filters can be exclusionary, i.e., cause the search system 504 to exclude items that match the metadata filter(s). Accordingly, the metadata filters can further allow a user to narrow down the search results while investigating whether an object visible in an image is subject to a type of visual intellectual property.

At block 1008, a decision can be made whether to initiate a search or not. In particular, the user interface server 520 can determine whether to cause a search to be initiated. As described above with respect to FIGS. 1A-1B, a user can transmit an indication that the user interface server 520 should initiate a search by selecting the search element 108. If a search should be initiated, the method 1000 proceeds to the next block 1010 to begin processing associated with preparing search parameters. Until the search element 108 is selected, the user interface server 520 can return to previous blocks 1002, 1004, 1006 associated with updating the presentation of the user interface and/or receiving additional user input.

In returning to block 1002, the presentation of the input image(s) can be updated. For example, a user can select a different image and/or select multiple images and the presentation of the input image(s) may update accordingly. In returning to block 1004, the presentation of the input image (s) may further update. In particular, in response to receiving a user selection associated with a coordinate relative to the input image, the user interface server 520 can update the presentation of the input image. For example, the user interface server 520 can cause presentation, in an updated user interface, of the input image overlaid with an indicator associated with the coordinate. As described above with respect to FIG. 1D, an example updated presentation is the position indicator 112 overlaid on the input image 102 shown in the user interface 100. As described above with respect to FIG. 4B, another example updated presentation is a bounding area 410, which can be a bounding box.

In returning to block 1006, additional user input can be received. For example, a user can make multiple user selections with respect to the same input image. The user interface server 520 can receive a second user selection associated with a second coordinate relative to the input image. Accordingly, a subsequent presentation of the input image can show a second indicator overlaid on the input image, such as the input image 102 described above with respect to FIG. 4A. Thus, the user can specify multiple features from different locations that the search system 504 should use when performing searches of item images. A user can make multiple user selections with respect to multiple input images. For example, FIG. 9B described above depicts an embodiment with multiple input images.

At block 1010, feature(s) can be identified. In particular, the search service 508 can identify features from the input image and/or the item images. As described herein, the search service 508 can use machine learning algorithms to identify features from images. For example, the search service 508 can receive an image and pass the image through a neural network, such as a convolutional neural network. The neural network can either be pre-trained or custom trained. The output of the neural network can be feature vectors on a grid. A feature vector is an example feature. An example feature vector is an array of numbers, where the numbers can describe characteristics of the image. One or more feature vectors can also be calculated using the neural network for a user defined interest point. In some embodiments, the feature vectors computed for the input image are used to estimate the feature vector for the user defined interest point. The search service 508 can interpolate feature values from the nearest feature vectors, which is described in further detail below, such as with respect to FIG. 11. The search service 508 can identify a feature where at least a portion of the feature is within a user selected area. Thus, the search service 508 can determine features for the input image and item images.

In some embodiments, the search service 508 can identify features without user input. As described herein, the input image can be a line drawing. The search service 508 can select an area of the line drawing based on detection of solid line. Additionally or alternatively, the search service 508 can ignore the broken line portions of the line drawing.

At block 1012, weight(s) can be determined. In particular, the search service 508 can determine weights for one or more features and/or feature vectors used to compute the feature vector corresponding to the user selected interest point. The search service 508 can increase the weights for feature vectors associated with grid points that are near the area of the user selected interest point and decrease the weights of feature vectors for grid points that are farther away from the user selected interest area. The search service 508 can identify a first feature vector of the input image for a grid point that is proximal to the area of the user selected interest point and a second feature vector for a grid that is the next closest grid point to the area of the user selected interest area. A feature vector for the user selected interest area is when calculated from the weighted sums of the feature vectors for the adjacent grid points where the weights are proportion to how close the interest point is to the grid points. The search service 508 can assign a first weight to the first feature, wherein the first weight assigns a higher relevance to the first feature vector relative to the second feature vector. In some embodiments, the second feature vector can have a second weight and the first weight can be lower than the second weight. For convenience, the terms "proximal" and "distal" are used herein to describe the distance between the grid point where the feature vectors are calculated and the location of the user selected interest area. The term "distal" refers to a position on an image that is farther away from the particular coordinate. The term "proximal" refers to a position on an image that is closer to the particular coordinate. In some embodiments, a feature vector for the user selected interest area is computed as a weighted average of the feature vectors for nearest grid points.

At block 1014, the search can be executed. In particular, the search service 508 can execute a search of item images based on the input image. In some embodiments, the search service 508 can execute a search of item images based at least in part on the input image and/or one or more user selected coordinates or features. The search service 508 can compare a particular user selected feature from the input image with any feature from an image in the catalog images. The search service 508 can receive search results. Each search result of the set of search results can be associated with an item image. An example search result can include an item data entry or object. The item data entry or object can include one or more item images, one or more item descriptions, an item title, an item byline, an entity that makes or distributes the item, and/or an item identifier.

Once the feature vectors have been computed for the input image and for the user selected interest area, the computer system starts a search for images in the catalog that match the input area and the user selected interest point. In some embodiments, the search is carried out by looking for images having similar feature vectors. In some embodiments, the similarity of a feature vector is determined by the Euclidean distance between the feature vectors. In some embodiments, a search is conducted for images having a feature vector that is close to the feature vector computed for the user defined interest point. Additionally or alternatively, images could be selected based on the overall similarity of the feature vectors with an emphasis (e.g. more weight) given to images that have a feature vector that is close to the feature vector for the user defined interest point. As part of executing the search, the search service 508 can assign a higher relevance to an item image with a feature corresponding to an input image feature at the user selected coordinate. In some embodiments, the user selected coordinate or area can be associated with an exclusion option where the feature vectors for the grid points corresponding to the excluded areas are not compared. Thus, the search service 508 can ignore a feature of the input image at a coordinate.

In some embodiments, executing the search results can include applying metadata filters. For example, search results can be included if a metadata filter matches metadata of a search result. Conversely, if a search parameter includes exclusionary metadata filters, search results can be excluded if a metadata filter matches metadata of a search result.

In some embodiments, the search service 508 can identify search results based on distances of feature vectors. As described herein, the search service 508 can determine a first feature vector of the input image and a second feature of an item image. The search service 508 can calculate a difference between the first feature vector and the second feature vector. If the search service 508 determines that the difference is within a threshold distance, the search service 508 can add the item to the set of search results. The search service 508 can locate images by applying a fast nearest neighbor search, which can use an index. In some embodiments, the search service 508 can apply a Euclidean distance function to find a threshold number of nearest neighbors. The search results can be ranked by increasing distance value between the search features from the input image and the indexed feature vectors of the item images.

In some embodiments, where there are multiple user selections, the search service 508 can extract features and conduct searches in a combined manner. For example, the multiple user selections can be reflected in the same output of feature vectors in a grid. For example, an inclusion user selection can be searched for together as represented by a combined group of feature vectors in a grid. Conversely, in other embodiments, the search service 508 can perform individual searches for each user selection and can combine the search results later, as described in further detail below with respect to blocks 1016 and 1017 regarding conducting additional searches and combining search results. For example, an inclusion user selection can be searched for separately than an exclusion user selection.

At block 1016, a decision can be made whether additional searches should be executed. In particular, the search service 508 can determine whether to cause an additional search to be initiated. In some embodiments, the user interface can be configured to present multiple sets of search results. The first set of search results can be based on one or more user selected features or coordinates and the second set of search results can be based on the overall appearance of the input image and item images without weighting features of the input image differently. If a second search is to be performed, the method 1000 can return to blocks 1010, 1012, 1014 for establishing second search parameters and executing a second search. For example, in the context of a second search, where a first feature of the input image that is proximal to a coordinate relative to a second feature of the input image, the search service 508 does not weight the first feature differently than the second feature.

Another example of multiple searches is where there are multiple input images for the same search. For example, as described above with respect to FIG. 9B, the search service 508 can retrieve a first set search results based on features of the first user selected area 954 and the first input image 952, and a second set search results based on features of the second user selected area 958 and the second input image 958. The search service 508 can combine the first and second set of search results to produce a single ranked list of search results. An item with an item that has a high ranking on both the first and second set of search results will have a high ranking on the single ranked list of search results.

Yet another example of multiple searches is where the search service 508 is configured to process each user selection (even with respect to the same input image) as an individual search. For example, the search service 508 can execute a first search based at least on a first user selection of an input image and receive a first set of search results. The search service 508 can further execute a second search based at least on a second user selection of the same input image and receive a second set of search results.

At block 1017, multiple search results can be combined (where applicable). In particular, the search service 508 can combine multiple search results with respect to multiple input images and/or multiple user selections of the same input image, depending on the embodiment. As described herein, there can be multiple sets of search results, such as a first set and a second set. The search service 508 can combine the multiple sets of search results to generate a single ranked list. For example, if a search result had a relatively high relevance on the first set and the second set, the search result would have a relatively high relevance in the combined ranked list. Conversely, if a search result had a relatively low (or non-existent) relevance on the first set and the second set, the search result would have a relatively low relevance in the combined ranked list. In the middle case, if a search result had a relatively low (or non-existent) relevance in one set and a relatively high relevance in a second set, that search result would be ranked lower than the relatively high relevance result but higher than the relatively lower search result. In some cases, multiple sets of search results do not need to be combined, such as the user interface 200 of FIG. 2 that presents the feature weight and global results separately.

At block 1018, search results can be presented. For example, the user interface server 520 can present the search results in a user interface. With respect to FIG. 1E described above, the search results area 114 in the user interface 100 is an example presentation of search results. With respect to FIG. 2 described above, another example presentation of search results are the first search results area 218 and the second search results area 222, where first search results area 218 have results using user-selected features (which also takes into account the overall appearance of the images) and the second search results area 222 has search results based more exclusively on the overall appearance of the images. Another example presentation of search results is shown and described above with respect to the user interface 300 of FIG. 3.

In some embodiments, the search results can be presented in a consolidated results user interface. The search service 508 can organize the set of search results into groups. The search service 508 can identify, for each of the groups, a representative item image. The search service 508 can group search results based on metadata, a similarity score based on images, and/or some combination thereof. For example, the search service 508 can apply a clustering algorithm to the search results. The user interface server 520 can cause presentation, in the consolidated results user interface, of the representative item image for each of the groups. An example consolidated results user interface is the user interface 800, which is described above in further detail with respect to FIG. 8.

Figure 11:
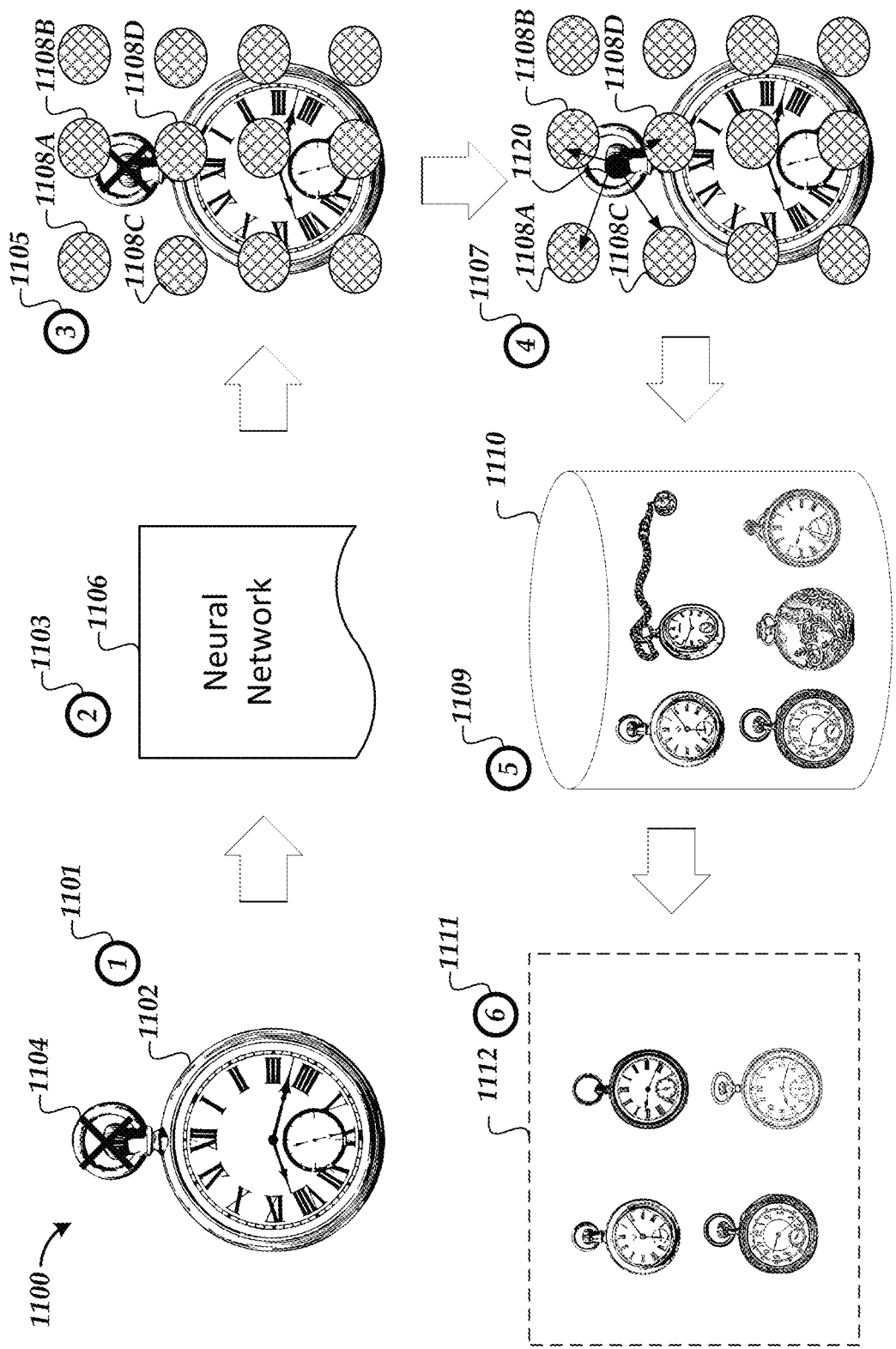
FIG. 11 is a pictorial diagram illustrating a machine learning process for user-selected feature detection.

FIG. 11 illustrates steps of a machine learning process 1100 for user-selected feature detection. At step 1101, the input image 1102 can be received by the user interface server 520. As described herein, the user interface server 520 can receive a user selection 1104 associated with a coordinate relative to the input image 1102. At step 1103, the search service 508 can compute feature vectors from the input image 1102 using the neural network 1106. The neural network 1106 can receive the input image 1102 as input.

In some embodiments, the neural network 1106 can be pre-trained. An example neural network is a convolutional neural network, such as ResNet that was pre-trained on ImageNet. At step 1105, the search service 508 can extract the feature vectors 1108A, 1108B, 1108C, 1108D from a layer of the convolutional neural network 1106. In some embodiments, the feature vectors can be extracted from a layer of the neural network 1106, where the layer outputs feature vectors on a grid. In some embodiments, the feature vectors on a grid can be output from a non-final layer (for example, the fourth or fifth layer of a convolutional neural network such as ResNet). The layer used can be a layer that computes an X by Y (e.g., 7×7 or 3×4 etc. depending on the resolution of the input images and the particular neural network) grid of feature vectors. The grid of feature vectors can be mapped to known locations in the input image 1102. Each feature vector is an array of values (e.g., 2000 or so values), which can depend on the type of neural network 1106 used. For the purpose of searching images based on a user-selected feature detection, in some types of neural networks, using the final layer of the neural network outputs a single feature vector and may not be as efficacious relative to using a layer that outputs feature vectors on a grid. In other embodiments, depending on the type of neural network, a final layer of the neural network can be used where the final layer outputs feature vectors on a grid. In some types of neural networks, using early layers can be useful for smaller features and using later layers can be useful to identify larger features.

At step 1107, the search service 508 can compute the interpolated feature vector 1120 based on the user selected coordinate 1104. As shown, the user selected coordinate 1104 (a particular interest point selected by the user) does not line up exactly with the location of grid points where the feature vectors 1108A, 1108B, 1108C, 1108D are computed in the neural network. Since the location of the grid points where the feature vectors 1108A, 1108B, 1108C, 1108D for an image are calculated are fixed, the search service 508 calculates a feature vector for the interest point based on the distance between the location of the interest point 1104 and the location of the nearest grid points 1108A, 1108B, 1108C, 1108D. As described herein, the feature vector for the interest point can be computed as a weighted sum of the feature vectors at the nearest grid points where the weights are proportional to the distance. For example, if an interest point were equidistant between four neighboring grid points then the feature vector for the interest point would be the sum of the feature vectors for each of those grid points weighted by 0.25. In some embodiments, the nearest four grid points are used. However, in other embodiments, greater or fewer grid points could be used for computing the feature vector for the interest point.

For example, the search service 508 can take the nearest K points, which could be a configuration option, and use some other interpolation other than bi-linear to compute the feature vector for the interest point. The higher the K, the wider the area the search service 508 considers for the query feature vector. In some embodiments, the search service 508 could draw a circle (with some specified radius) and take in all the feature vectors for all the grid points within that circle. The system could also take the whole image and make the weight of a feature vector for a grid point inversely proportional to its distance to the user specified interest point.

In particular, the search service 508 can compute the interpolated feature vector 1120 from the grid feature vectors 1108A, 1108B, 1108C, 1108D that are adjacent to the user selected coordinate 1104. The search service 508 can bi-linearly interpolate the feature vector values from the nearest feature vectors 1108A, 1108B, 1108C, 1108D. In the depicted example, four nearest feature vectors are used for interpolation. In other embodiments, different quantities of nearby feature vectors can be used, such as six, eight, ten, etc. nearest feature vectors.

At step 1109, the search service 508 can perform a nearest neighbors search on the item image database 1110. The search service 508 can compute feature vectors from the item images in the item image database 1110. In some embodiments, the search service 508 pre-computes the feature vectors from the item images in the item image database 1110 before the input image 1102 is received. The database 1110 can be searched for image(s) having a feature vector that is the closest to the interest point feature vector at the point 1104. For example, if the database stores forty-nine feature vectors for each image, then the search service 508 compares the interest point feature vector at the point 1104 against the forty-nine feature vectors stored for each image in the database 1110. In some embodiments, the search service 508 determines the similarity of two feature vectors based on the Euclidian distance between the two feature vectors. The search service 508 can also calculate a score proportional to the inverse of the distance. The search service 508 can identify the images in database 1110 having the closest distance or the highest score. The search service 508 can limit the number of images identified (e.g., the top ten images). The search service 508 can perform a nearest neighbor search on the interpolated feature vector 1120 and the grid feature vectors of the input image 1102 and the feature vectors from the item images. At step 1111, the search service 508 can receive the search results 1112. The machine learning process 1100 can result in getting the features that are focused on in certain region in the search results 1112 but that still incorporate the whole input image with a lower weight.

Figure 12:
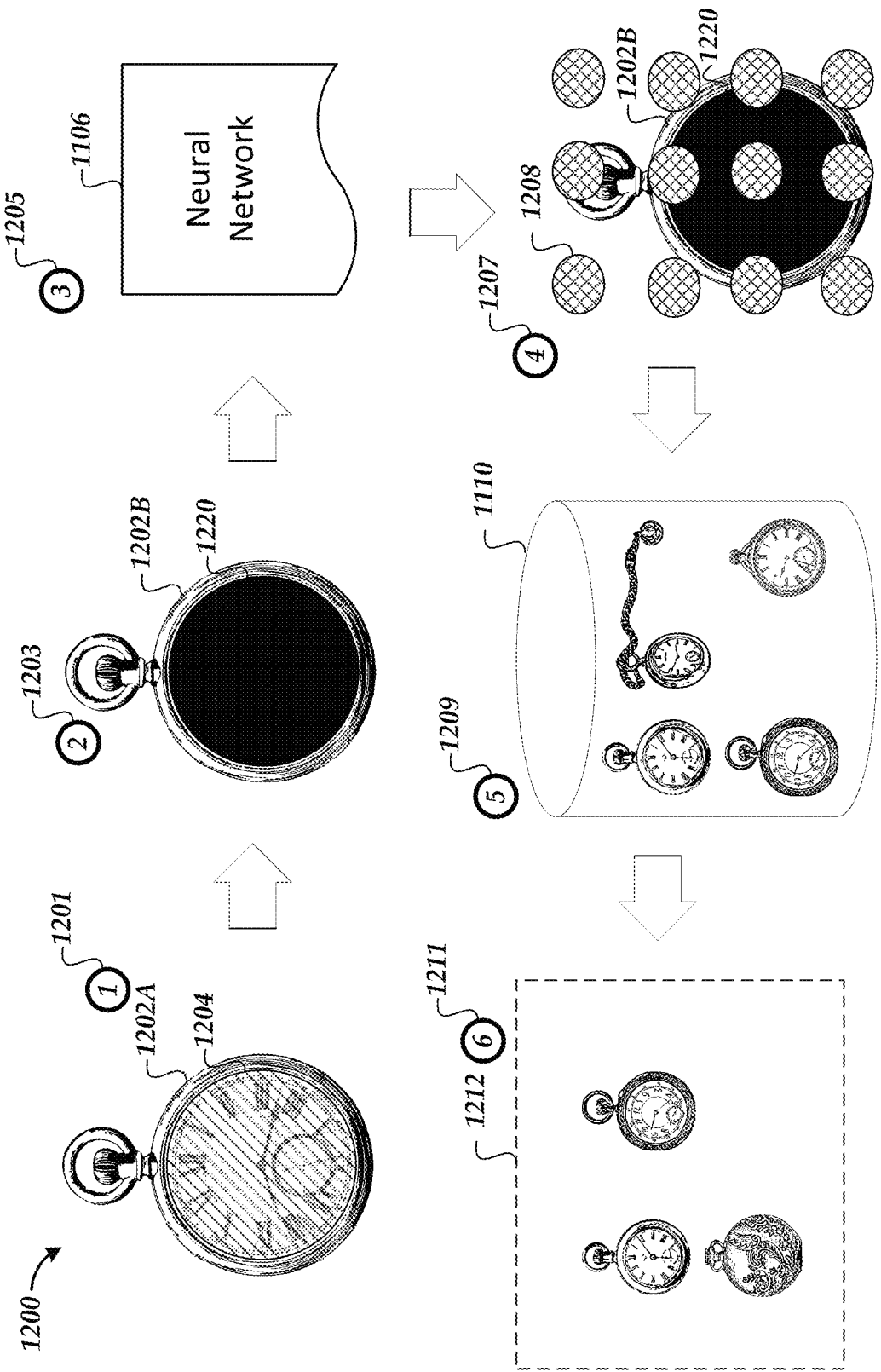
FIG. 12 is a pictorial diagram illustrating a machine learning process for user-selected feature exclusion.

FIG. 12 illustrates a machine learning process 1200 for user-selected feature exclusion. The machine learning process 1200 of FIG. 12 can be similar to the machine learning process 1100 of FIG. 11. However, unlike the machine learning process 1100 of FIG. 11 that is used to identify images having feature vectors that are similar to the feature vector of a user defined interest point, the machine learning process 1200 can ignore the user-selected region. At step 1201, the input image 1202A can be received by the user interface server 520. As described herein, the user interface server 520 can receive a user selection 1204 associated with a region relative to the input image 1202A. At step 1203, the search service 508 can mask the area 1220 of the input image 1202B that corresponds to the user-selected region 1204. At step 1105, the search service 508 can compute feature vectors from the masked input image 1202B using the neural network 1106. The neural network 1106 can receive the masked input image 1202B as input. At step 1207, the search service 508 can extract the feature vectors 1208 from a layer of the convolutional neural network 1106. At step 1209, the search service 508 can perform a nearest neighbors search on the item image database 1110. At step 1211, the search service 508 can receive the search results 1212. The machine learning process 1200 can obtain the search results 1212 that ignore the user-selected region 1204 based on the feature vectors 1208 computed from the masked input image 1202B.

Figure 13:
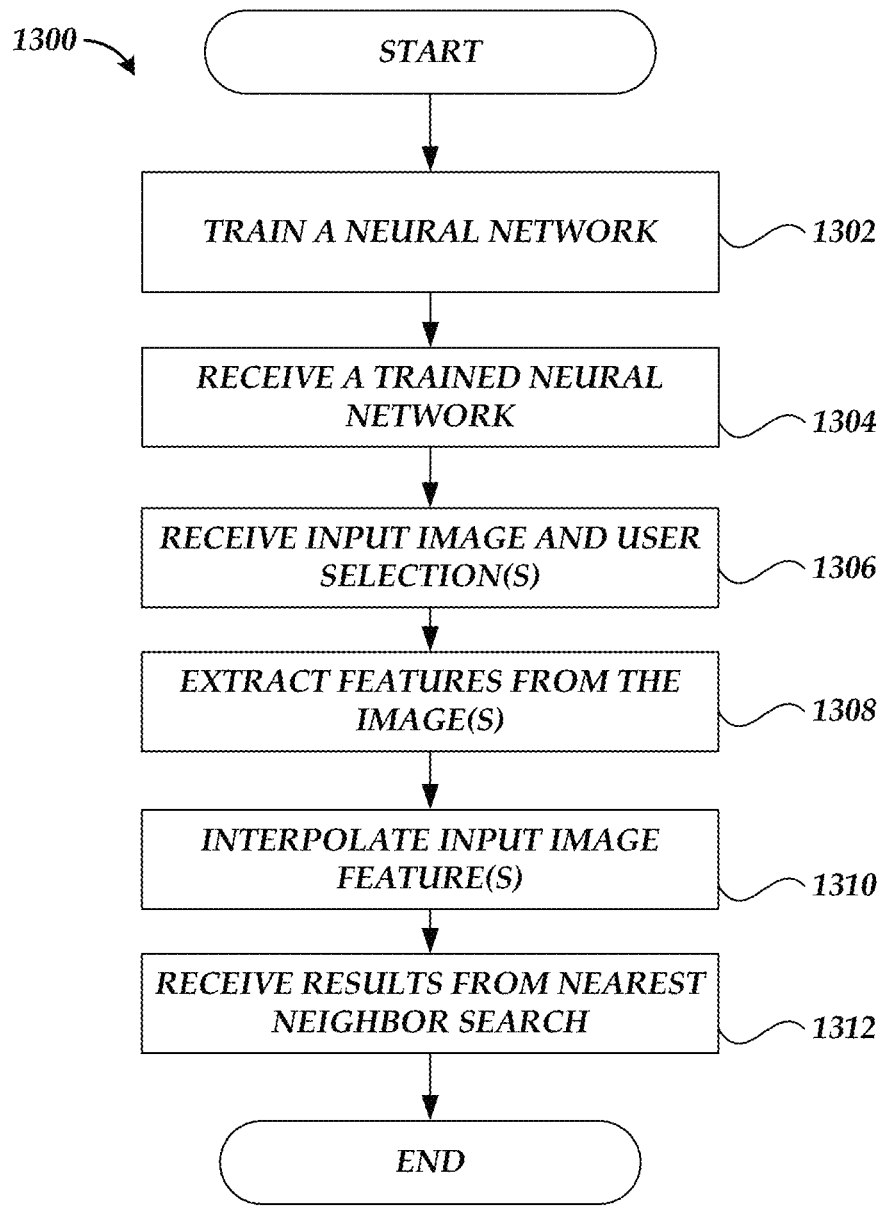
FIG. 13 is a flow chart depicting an example method for image-based machine learning.

FIG. 13 is a flow diagram depicting an example method 1300 implemented by the search system 504 for image-based machine learning. As described herein, the search system 504 may include the machine learning service 510. In some embodiments, the machine learning service 510 may include the machine learning application 624, and may implement aspects of the method 1300. The search system 504 may include the search service 508. In some embodiments, the search service 508 may include the search application 622, and may implement aspects of the method 1300. Some aspects of the method 1300 may be implemented by other components of the search system 504, such as the user interface server 520.

Aspects of the method 1300 relate to implementation details that can allow a user to identify possible infringing items in an on-line catalog of items. The method 1300 can include pre-computing a database of feature vectors for images of items in the catalog. The feature vectors can be computed in a layer of a convolutional neural network, such as RESNET, so long as the layer computes a grid of feature vectors. The layer can compute a grid of feature vectors at known locations in the image, where each feature vector is an array of values.

Beginning at block 1302, a neural network can be trained. In particular, the machine learning service 510 can train a neural network. In some embodiments, the neural network can be pre-trained and block 1302 can be performed by a third party. For example, the machine learning service 510 can use ResNet that was pre-trained on ImageNet. In other embodiments, the neural network can be custom trained. In some embodiments, the neural network can be invariant to color, e.g., is agnostic to color. In other embodiments, the neural network can be trained on color.

The machine learning service 510 can custom train a neural network. A training data set can be a supervised training data set that includes training examples. A single training example can include three images: (1) an input image along with a user specified coordinate or region; (2) a matching image (or positive image) that is presumed to be the subject to a type of visual intellectual property; and (3) a non-matching image (or negative image) that is presumed to not be the subject to a type of visual intellectual property. As described above, such as with respect to FIG. 11, the machine learning service 510 can calculate an interpolated feature vector for the user specified coordinate or region, which can be referred to as the search feature vector, $V_s$. The machine learning service 510 can compute feature vectors on a grid for the matching (or positive) image and takes the feature vector that is closest to the search feature vector, which can be referred to as $V_p$. The machine learning service 510 can compute the closest feature vector in the non-matching (or negative) image, which can be referred to as $V_n$. The machine learning service 510 can train the neural network using a loss function. The loss function can prioritize making the distance between $V_s$ and $V_p$ to be less than the distance between $V_s$ and $V_p$. An example loss function can substantially correspond to: loss=Max($D(V_s, V_p)-D(V_s, V_n)+a$, 0) where D is a distance metric such as a Euclidean distance and a is a margin parameter.

The machine learning service 510 can further train a customized neural network using line drawings. Instead of the user specified coordinate or region, the machine learning service 510 can use a center point of the solid lines. Moreover, the machine learning service 510 can use a first neural network for the input image (the line drawing) and a second neural network for the positive and negative images. The first neural network for the input image (the line drawing) can further be trained to learn weights that do not derive any signals from the broken lines. The use of different networks helps the first network to train custom weights for line drawings, and the second network to train the weights for item images.

At block 1304, as described herein, a trained neural network from the previous block 1302 can be received. At block 1306, an input image and user selections can be received. As described herein, if a line drawing is used as the input image, user selections may not be needed. Moreover, for a global search, a user selection may not be used. As described herein, multiple input images and user selections may be supported for a single search.

The input image and the images of the items are not required to be of the same size. Since fully convolutional networks can be used, it is possible to feed images of any size into the neural network and generate feature vectors on a grid. However, in some embodiments, there can be performance advantages to the images in the item data storage 512 having similar resolutions. As described herein, in some embodiments, if the input images to the neural network are the same size, then the output feature grids may be the same size. Accordingly, the search service 508 can resize images such that a shorter side has a specific size (such as 448 pixels, for example). The larger side of the image can be resized such that the original aspect ratio is maintained.

At block 1308, feature vectors can be extracted from the input image and the item images. As described above, feature vectors can be extracted from a layer of the neural network, such as a layer of the neural network that outputs feature vectors on a grid. In some embodiments, the feature vectors can be extracted from the item images as a pre-computation step. Accordingly, the feature extraction of item images can be performed before the block 1306 that relates to receiving an input image and/or user selection(s). In some embodiments, the features are indexed using a fast approximate nearest neighbor search system. At run time, the neural network can compute a feature vector for a given query image and a user specified interest point. This feature vector can be compared against all the feature vectors in the index. The comparison can be performed using a function, such as a Euclidian distance or a cosine similarity or distance. The smaller the distance, the better match can be. As described herein, a score proportional to the inverse of the distance can also be computed. Therefore, the search service 508 can output the images in the order of decreasing score or increasing distance.

In some embodiments, the layer of the neural network to be used can be determined by the search system 504. For example, the search system 504 can use different layers of the neural network and determine which of the layers yield better results. During training at the previous block 1302, the machine learning service 510 can compare performance of multiple layers of a neural network based on supervised training data and select a particular layer. The selected layer of a neural network can be referred to as a hyper-parameter.

As described herein, if the user selection is for an exclusion, the input image can be masked and feature values can be determined based on the masked input image. An input image can be masked in a variety of ways. In particular, the search service 508 can black out the area specified by a user.

Additionally or alternatively, the search service 508 can apply a pixel-wise (i.e., one pixel at a time) mask to the area. The search service 508 can further set the pixel-wise mask to a mean intensity value for the value. A result of the masking is that the feature vectors for the masked values do not contribute much to the search. The feature vectors for the masked area can be actually or effectively null values.

At block 1310, an input image feature vector can be interpolated. As described herein, feature interpolation may not be necessary where there is a global search or a user selection is for an exclusion. At block 1312, search results can be received from a nearest neighbor search. The interpolated input image feature vector can be allowed to match any grid point in the catalog images. As described herein, the method 1300 can support multiple input images and user selections. For instance, a user might identify the heels in one shoe image and straps in another shoe image as representing their intellectual property. The search service 508 can search for images having the nearest neighbors feature vectors compared with the feature vectors computed to the heel or strap area of the shoe and then combine them to produce a single ranked list.

While many embodiments discussed herein use a pocket watch as an example, the systems and methods described herein for investigating whether an object visible in an image is subject to a type of visual intellectual property in a search system can be applied to any other type of item, such as bedding, shoes, or furniture. In some embodiments, the selected convolutional network layer that is used to extract features may be different depending on the size of feature in the type of item (for example, shoes versus furniture). As described herein, some layers of a neural network may be better suited at detecting smaller features while other layers of the neural network may be better at detecting larger features. Further, while many embodiments discussed herein use design patents or applications as an example, the systems and methods described herein can be applied to other intellectual property such as copyrights and trademarks. Yet further, while many embodiments discussed herein relate to identify whether an object visible in an image is subject to a type of visual intellectual property, the systems and methods described herein can be applied to enabling a user of an electronic catalog, such as a customer, to search a catalog for new products based on a feature the user likes from a known product, such as the particular heel of a shoe that the customer likes (or dislikes). As described herein, a user could specify multiple input images which could be used for searching and the search results could be combined.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Further, the term "each," as used herein, in addition to having its ordinary meaning, can mean any subset of a set of elements to which the term "each" is applied.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A computer-implemented method comprising:
    under control of a computer hardware processor configured with specific computer executable instructions,
        receiving an input image of an object considered subject to an intellectual property right;
        causing presentation, in a user interface, of the input image;
        receiving, via the user interface, a user selection indicating a coordinate position in the input image;
        causing presentation, in the user interface, of the input image overlaid with an indicator associated with the coordinate position;
        identifying a first feature at a first coordinate in the input image that is proximal to the coordinate position relative to a second feature at a second coordinate in the input image;
        assigning, based at least in part on the first feature at the first coordinate in the input image being proximal to the coordinate position relative to the second feature at the second coordinate in the input image, a first weight to the first feature, wherein the first weight assigns a higher relevance to the first feature relative to the second feature with a second weight;
        executing a first search of a database of item images based at least in part on the input image and the coordinate position, wherein executing the first search further comprises:
            identifying a first search result associated with a first image based at least in part on the first weight, the second weight, and a plurality of features of the first image; and
            adding the first search result to a first set of search results, wherein each search result of the first set of search results is associated with an item image of an item similar to the object of the input image; and
        causing presentation of the first set of search results.

2. The computer-implemented method of claim 1, further comprising:
    executing a second search of the database of item images based at least in part on the input image, wherein in executing the second search, the first feature is not weighted differently than the second feature, wherein executing the second search further comprises:
        receiving a second set of search results, wherein each search result of the second set of search results is associated with an item image of an item similar to the object considered subject to the intellectual property right; and
        causing presentation of the second set of search results.

3. The computer-implemented method of claim 1, wherein the user selection comprises a user selected area relative to the input image.

4. The computer-implemented method of claim 1, wherein the indicator comprises a bounding box.

5. A system comprising:
    a data storage medium configured to store a plurality of item images having feature vectors computed at a number of grid points computed by a neural network; and
    one or more computer hardware processors in communication with the data storage medium, wherein the one or more computer hardware processors are configured to execute computer-executable instructions to at least:
        cause presentation, in a user interface, of an input image of an object selected by a user illustrating intellectual property of the user;
        receive, via the user interface, an interest point at a coordinate position in the input image where the intellectual property is represented in the input image;
        cause presentation, in the user interface, of the interest point selected by the user;
        analyze the input image with the neural network to determine feature vectors at a number of grid points;
        identify a first feature vector at a first coordinate in the input image based on feature vectors associated with grid points adjacent to the interest point at the coordinate position selected by the user, wherein the first feature vector at the first coordinate is proximal to the coordinate position relative to a second feature vector at a second coordinate in the input image;
        assign, based at least in part on the first feature vector at the first coordinate in the input image being proximal to the coordinate position relative to the second feature vector at the second coordinate in the input image, a first weight to the first feature vector, wherein the first weight assigns a higher relevance to the first feature vector relative to the second feature vector with a second weight;
        execute a search of the plurality of item images to identify one or more images that show the intellectual property based on the first feature vector, the first weight, the second feature vector, and the second weight; and
        cause presentation of the one or more images that show the identified intellectual property.

6. The system of claim 5, wherein the search that is executed further ignores a second feature of the input image, and wherein the one or more computer hardware processors are configured to execute further computer-executable instructions to at least:

receive, via the user interface, user input indicating selection of an exclude option.

7. The system of claim 5, wherein the one or more computer hardware processors are configured to execute further computer-executable instructions to at least:
receive, via the user interface, a second interest point in the input image; and
cause presentation, in the user interface, of the second interest point, wherein to execute the search is further based at least in part on the second interest point.

8. The system of claim 5, wherein the one or more computer hardware processors are configured to execute further computer-executable instructions to at least:
receive, via the user interface, a metadata filter; and
apply the metadata filter to metadata associated with a set of search results comprising at least an item associated with the one or more images.

9. The system of claim 5, wherein
the user interface comprises a consolidated results user interface,
a set of search results comprises at least an item associated with the one or more images, and
to cause presentation of the one or more images, the one or more computer hardware processors are configured to execute further computer-executable instructions to at least:
organize the set of search results into a plurality of groups;
identify, for each group of the plurality of groups, a representative item image; and
cause presentation, in the consolidated results user interface, of the representative item image for each group of the plurality of groups.

10. The system of claim 5, wherein to execute the search of the plurality of item images, the one or more computer hardware processors are configured to execute further computer-executable instructions to at least:
determine a third feature vector of a first item image from the plurality of item images, wherein the first item image is associated with a first item;
calculate a difference between the first feature vector and the third feature vector;
determine that the difference is within a threshold distance; and
add the first item to a set of search results.

11. The system of claim 5, wherein the intellectual property is a design patent.

12. A system for identifying potential intellectual property risks from images, the system comprising:
a data storage medium configured to store a plurality of item images; and
one or more computer hardware processors in communication with the data storage medium, wherein the one or more computer hardware processors are configured to execute computer-executable instructions to at least:
cause presentation, in a user interface, of an input image of an object;
receive, via the user interface, a user selection indicating a coordinate position in the input image;
identify a first feature at a first coordinate in the input image that is proximal to the coordinate position relative to a second feature at a second coordinate in the input image, the first feature from the input image representing intellectual property in the input image;
assign, based at least in part on the first feature at the first coordinate in the input image being proximal to the coordinate position relative to the second feature at the second coordinate in the input image, a first weight to the first feature, wherein the first weight assigns a higher relevance to the first feature relative to the second feature with a second weight;
execute a search of the plurality of item images based at least in part on the first feature, wherein to execute the search of the plurality of item images, the one or more computer hardware processors are configured to:
identify a first search result associated with a first image based at least in part on the first weight and the second weight; and
cause presentation of the first image identified by the first search result, wherein the first image is associated with an item having a feature that is similar to the first feature representing the intellectual property.

13. The system of claim 12, wherein the input image comprising a line drawing, wherein the line drawing comprises a solid line and a broken line.

14. The system of claim 13, wherein to identify the first feature from the input image the one or more computer hardware processors are configured to execute further computer-executable instructions to at least identify the first feature indicated by the solid line of the input image.

15. The system of claim 12, wherein to execute the search of the plurality of item images, the one or more computer hardware processors are configured to execute further computer-executable instructions to at least:
determine a third feature vector of the first image;
calculate a difference between a first feature vector for the first feature and the third feature vector; and
determine that the difference is within a threshold distance.

16. The system of claim 12, wherein the user selection further specifies a user selected area of the input image, wherein the coordinate position defines boundary point of the user selected area.

17. The system of claim 16, wherein to identify the first feature, the one or more computer hardware processors are configured to execute further computer-executable instructions to at least determine that at least a portion of the first feature is within the user selected area.

\* \* \* \* \*